United States Patent
Minagawa

(10) Patent No.: US 8,885,199 B2
(45) Date of Patent: Nov. 11, 2014

(54) PRINT SYSTEM, RELAY SERVER, PROCESSING DEVICE, PRINT SYSTEM CONTROL METHOD, AND STORAGE MEDIUM FOR COLLECTIVELY SETTING PRINT ITEMS

(71) Applicant: Canon Kabushiki Kaisha, Tokyo (JP)

(72) Inventor: Tomonori Minagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 13/670,774

(22) Filed: Nov. 7, 2012

(65) Prior Publication Data
US 2013/0135668 A1 May 30, 2013

(30) Foreign Application Priority Data
Nov. 29, 2011 (JP) .................. 2011-259715

(51) Int. Cl.
*G06F 3/12* (2006.01)
*G06F 15/00* (2006.01)

(52) U.S. Cl.
USPC .................................... 358/1.15; 358/1.13

(58) Field of Classification Search
CPC ... G06F 3/1204; G06F 3/1211; G06F 3/1224; G06F 3/1289; G06F 3/1244; G06F 3/1286; G06F 3/1287; G06F 3/1288; G06K 1/1502
USPC ......... 358/1.1, 1.11–1.18, 400–404; 709/201, 709/202, 203, 211–219; 718/1, 100–106; 710/8, 14–18, 31, 33
See application file for complete search history.

(56) References Cited

U.S. PATENT DOCUMENTS

| | | | |
|---|---|---|---|
| 6,445,973 B1 * | 9/2002 | Sagasaki et al. | 700/180 |
| 7,345,779 B2 | 3/2008 | Tamai et al. | |
| 7,716,346 B2 * | 5/2010 | Suzuki et al. | 709/228 |
| 8,305,626 B2 * | 11/2012 | Takei | 358/1.16 |
| 2007/0006234 A1 * | 1/2007 | Ogata | 718/101 |

FOREIGN PATENT DOCUMENTS

JP 2003-196054 A 7/2003

* cited by examiner

*Primary Examiner* — Gabriel Garcia
(74) *Attorney, Agent, or Firm* — Carter, DeLuca, Farrell & Schmidt, LLP

(57) ABSTRACT

The information processing device of the present invention transmits printer information including a print setting to a print service device and registers the printer information in the print service device. Then, the information processing device receives a request for realizing a batch setting in the print service server in which a plurality of print settings is settable in a collective manner. When the request has been received, the information processing device registers batch setting printer information regarding the same printer as that corresponding to the printer information and corresponds to the setting content of the batch setting desired for implementation, in addition to the printer information in the print service device.

11 Claims, 27 Drawing Sheets

FIG. 12A

| 1201 | 1202 | 1203 | 1204 | 1205 |
|---|---|---|---|---|
| VPID | RPID | Printer name | Capabilities | Print setting initial value |
| VP-1 | RP-1 | Printer 1 | PC-1 | PT-1 |
| VP-2 | RP-2 | Printer 2 | PC-2 | PT-2 |
| VP-3 | RP-3 | Printer 3 | PC-3 | PT-3 |

FIG. 12B

| 1211 | 1212 | 1213 |
|---|---|---|
| User ID of print relay system | List of available VPIDs | Print setting specified value |
| UserA | VP-1 | PT-A1 |
|  | VP-2 | PT-A2 |
| UserB | VP-2 | PT-B2 |
|  | VP-3 | PT-B3 |

FIG. 12C

| 1221 | 1222 | 1223 |
|---|---|---|
| User ID of print relay system | Proxy ID | VPID |
| UserA | Proxy-A | VP-1 |
|  |  | VP-2 |
| UserB | Proxy-B | VP-2 |
|  |  | VP-3 |

FIG. 12D

| 1231 | 1232 | 1233 | 1234 | 1235 |
|---|---|---|---|---|
| SPID | VPID | Printer name | Capabilities | Print setting specified value |
| SP-A1 | VP-1 | Printer 1 | PC-1 | PT-A1 |
| SP-A2 | VP-2 | Printer 2 | PC-2 | PT-A2 |
| SP-B2 | VP-2 | Printer 2 | PC-2 | PT-B2 |
| SP-B3 | VP-3 | Printer 3 | PC-3 | PT-B3 |

FIG. 12E

| 1241 | 1242 | 1243 | 1244 | 1245 | 1246 |
|---|---|---|---|---|---|
| User ID of print service | SPID | Printer name | Proxy ID | Capabilities | Print setting specified value |
| UserA@xxx.com | SP-A1 | Printer 1 | Proxy-A | PC-1 | PT-A1 |
|  | SP-A2 | Printer 2 | Proxy-A | PC-2 | PT-A2 |
| UserB@xxx.com | SP-B2 | Printer 2 | Proxy-B | PC-2 | PT-B2 |
|  | SP-B3 | Printer 3 | Proxy-B | PC-3 | PT-B3 |
|  | SP-XX | Printer M | Proxy-M | ... | ... |

FIG. 13B1

| 1211 | 1212 | 1213 | 1214 | 1215 |
|---|---|---|---|---|
| User ID of print relay system | List of available VPIDs | Print setting specified value | ProfileName | ProfilePT |
| UserA | VP-1 | PT-A1 | Duplex + Mono | PT1-dup_mon |
| | | | Booklet + Saddle | PT1-bok_sdl |
| | VP-2 | PT-A2 | | |

FIG. 13B2

| 1211 | 1212 | 1213 | 1214 | 1215 | 1216 |
|---|---|---|---|---|---|
| User ID of print relay system | List of available VPIDs | Print setting specified value | ProfileName | ProfilePT | ProfilePC |
| UserA | VP-1 | PT-A1 | Duplex + Mono | PT1-dup_mon | PC1-dup_mon |
| | | | Booklet + Saddle | PT1-bok_sdl | PC1-bok_sdl |
| | VP-2 | PT-A2 | | | |

FIG. 13D1

| 1231 | 1232 | 1233 | 1234 | 1235 |
|---|---|---|---|---|
| SPID | VPID | Printer name | Capabilities | Print setting specified value |
| SP-A1 | VP-1 | Printer 1 | PC-1 | PT-A1 |
| SP-A1-1 | VP-1 | Printer 1 <Duplex + Mono> | PC-1 | PT1-dup_mon |
| SP-A1-2 | VP-1 | Printer 1 <Booklet + Saddle> | PC-1 | PT1-bok_sdl |
| SP-A2 | VP-2 | Printer 2 | PC-2 | PT-A2 |

FIG. 13E1

| 1241 | 1242 | 1243 | 1244 | 1245 | 1246 | 1247 | 1248 |
|---|---|---|---|---|---|---|---|
| User ID of print service | SPID | Printer name | Proxy ID | Capabilities | Print setting specified value | ProfileName | ProfilePT |
| UserA@xxx.com | SP-A1 | Printer 1 | Proxy-A | PC-1 | PT-A1 | Duplex + Mono | PT1-dup_mon |
| | | | | | | Booklet + Saddle | PT1-bok_sdl |
| | SP-A2 | Printer 2 | Proxy-A | PC-2 | PT-A2 | | |

FIG. 13E2

| 1241 | 1242 | 1243 | 1244 | 1245 | 1246 | 1249 |
|---|---|---|---|---|---|---|
| User ID of print service | SPID | Printer name | Proxy ID | Capabilities | Print setting specified value | Original SPID |
| UserA@xxx.com | SP-A1 | Printer 1 | Proxy-A | PC-1 | PT-A1 | - |
| | SP-A1-1 | Printer 1 ⟨Duplex + Mono⟩ | Proxy-A | PC-1 | PT1-dup_mon | SP-A1 |
| | SP-A1-2 | Printer 1 ⟨Booklet + Saddle⟩ | Proxy-A | PC-1 | PT1-bok_sdl | SP-A1 |
| | SP-A2 | Printer 2 | Proxy-A | PC-2 | PT-A2 | - |

FIG. 13E3

| 1241 | 1242 | 1243 | 1244 | 1245 | 1246 |
|---|---|---|---|---|---|
| User ID of print service | SPID | Printer name | Proxy ID | Capabilities | Print setting specified value |
| UserA@xxx.com | SP-A1 | Printer 1 | Proxy-A | PC-1 | PT-A1 |
| | SP-A1-1 | Printer 1 ⟨Duplex + Mono⟩ | Proxy-A | PC1-dup_mon | PT1-dup_mon |
| | SP-A1-2 | Printer 1 ⟨Booklet + Saddle⟩ | Proxy-A | PC1-bok_sdl | PT1-bok_sdl |
| | SP-A2 | Printer 2 | Proxy-A | PC-2 | PT-A2 |

FIG. 14A

```
<PC-1>
    <Duplex>
        <Item>1-Side</Item>
        <Item>2-Side</Item>
    </Duplex>
    <Color>
        <Item>mono</Item>
        <Item>color</Item>
    </Color>
    <PaperSize>
        <Item>B5</Item>
        <Item>A4</Item>
        <Item>A3</Item>
    </PaperSize>
    <Layout>
        <Item>Normal</Item>
        <Item>2up</Item>
        <Item>Booklet</Item>
    </Layout>
    <Staple>
        <Item>None</Item>
        <Item>UpperLeft</Item>
        <Item>Saddle</Item>
    </Staple>
</PC-1>
```

FIG. 14A1

```
<PC-1>
    <Profile>          1381
        <Item>Default</Item>
        <Item>Duplex + Mono</Item>
        <Item>Booklet + Saddle</Item>
    </Profile>
           :
</PC-1>
```

FIG. 14A2

```
<PC1_dup_mon>
    <Duplex>
        <Item>2-Side</Item>
    </Duplex>
    <Color>
        <Item>mono</Item>
    </Color>
    <PaperSize>
        <Item>B5</Item>
        <Item>A4</Item>
        <Item>A3</Item>
    </PaperSize>
           :
</PC1_dup_mon>
```

FIG. 14B

```
<PT-A1>
    <Duplex>
        <Item>1-Side</Item>
    </Duplex>
    <Color>
        <Item>color</Item>
    </Color>
    <PaperSize>
        <Item>A4</Item>
    </PaperSize>
    <Layout>
        <Item>Normal</Item>
    </Layout>
    <Staple>
        <Item>None</Item>
    </Staple>
</PT-A1>
```

FIG. 14C

```
<PrintSettings>
    <Duplex>
        <Item>2-Side</Item>
    </Duplex>
    <Color>
        <Item>mono</Item>
    </Color>
    <PaperSize>
        <Item>A4</Item>
    </PaperSize>
    <Layout>
        <Item>Normal</Item>
    </Layout>
    <Staple>
        <Item>None</Item>
    </Staple>
</PrintSettings>
```

FIG. 14B1

```
<PT1-dup_mon>
    <Duplex>
        <Item>2-Side</Item>
    </Duplex>
    <Color>
        <Item>mono</Item>
    </Color>
    <PaperSize>
        <Item>A4</Item>
    </PaperSize>
    <Layout>
        <Item>Normal</Item>
    </Layout>
    <Staple>
        <Item>None</Item>
    </Staple>
</PT1-dup_mon>
```

FIG. 14B3

```
<PT-A1>
    <Profile>           1391
        <Item>Default</Item>
    </Profile>
    <Duplex>
        <Item>1-Side</Item>
    </Duplex>
    <Color>
        <Item>color</Item>
    </Color>
    <PaperSize>
        <Item>A4</Item>
    </PaperSize>
    <Layout>
        <Item>Normal</Item>
    </Layout>
    <Staple>
        <Item>None</Item>
    </Staple>
</PT-A1>
```

FIG. 14B2

```
<PT1-bok_sdl>
        :
    <Layout>
        <Item>Booklet</Item>
    </Layout>
    <Staple>
        <Item>Saddle</Item>
    </Staple>
</PT1-bok_sdl>
```

FIG. 14C1

```
<PrintSettings>
    <Profile>
        <Item>Duplex + Mono</Item>
    </Profile>
        :
</PrintSettings>
```

FIG. 15D

```
<Register>
    <name>
        <Item>Printer 1</Item>               ~1341
    </name>
    <proxy>
        <Item>Proxy-A</Item>                 ~1342
    </proxy>
    <Capabilities>
        <Duplex>                             ~1343
            <Item>1-Side</Item>
            <Item>2-Side</Item>
        </Duplex>
        <Color>
            <Item>mono</Item>
            <Item>color</Item>
        </Color>
        <PaperSize>
            <Item>B5</Item>
            <Item>A4</Item>
            <Item>A3</Item>
        </PaperSize>
    </Capabilities>
    <PrintSettings>
        <Duplex>                             ~1344
            <Item>1-Side</Item>
        </Duplex>
        <Color>
            <Item>color</Item>
        </Color>
        <PaperSize>
            <Item>A4</Item>
        </PaperSize>
    </PrintSettings>
    .........
</register>
```

FIG. 15E

```
<Printers>
    <id>                                     1351
        <Item>58467595613186</Item>
    </id>
    <name>
        <Item>Printer 1</Item>
    </name>
    <proxy>
        <Item>Proxy-A</Item>
    </proxy>
</printers>
```

FIG. 15F

```
<PrintJob>
    <printerid>                     1361
        <Item>58467595613186</Item>
    </printerid>
    <id>
        <Item>8023610500269699</Item>
    </id>
    <title>
        <Item>Doc1</Item>
    </title>
    <status>
        <Item>QUEUED</Item>
    </status>
    <dataUrl>                       1362
        <Item>Http://prt.srv.com/
        data/8023610500269699</Item>
    </dataUrl>
    <settingUrl>                    1363
        <Item>http://prt.srv.com/
        setting/8023610500269699</Item>
    </settingUrl>
</PrintJob>
```

FIG. 15G

```
<PrintJob>
    <id>
        <Item>7595613186892035</Item>
    </id>
    <title>
        <Item>Doc1</Item>
    </title>
    <status>
        <Item>QUEUED</Item>
    </status>
    <dataUrl>                       1371
        <Item>http://vprinter.com/VP-BCH-8EA1CB19/
        data/7595613186892035</Item>
    </dataUrl>
    <settingUrl>                    1372
        <Item>http://vprinter.com/VP-BCH-8EA1CB19/
        setting/7595613186892035</Item>
    </settingUrl>
</PrintJob>
```

FIG. 16A

Add/Delete composite settings

Created composite settings — 1401

Duplex + Mono — Delete

Booklet + Saddle — Delete — 1402

New creation

| | | |
|---|---|---|
| Basic: | Color setting: | color ▽ — 1403 |
| | Page size: | A4 ▽ |
| Output designation: | Duplex printing: | 1-Side ▽ |
| | Layout: | Normal ▽ |
| | Stapling: | None ▽ |

Name: [_____] — 1404

Register — 1405

Register composite settings

Log-in User

Mr./Mrs. User A

Available printer — 1411

Printer-1 ▽

Composite settings to be registered — 1412

☐ Duplex + Mono

☐ Booklet + Saddle — 1413

Register

FIG. 16C1
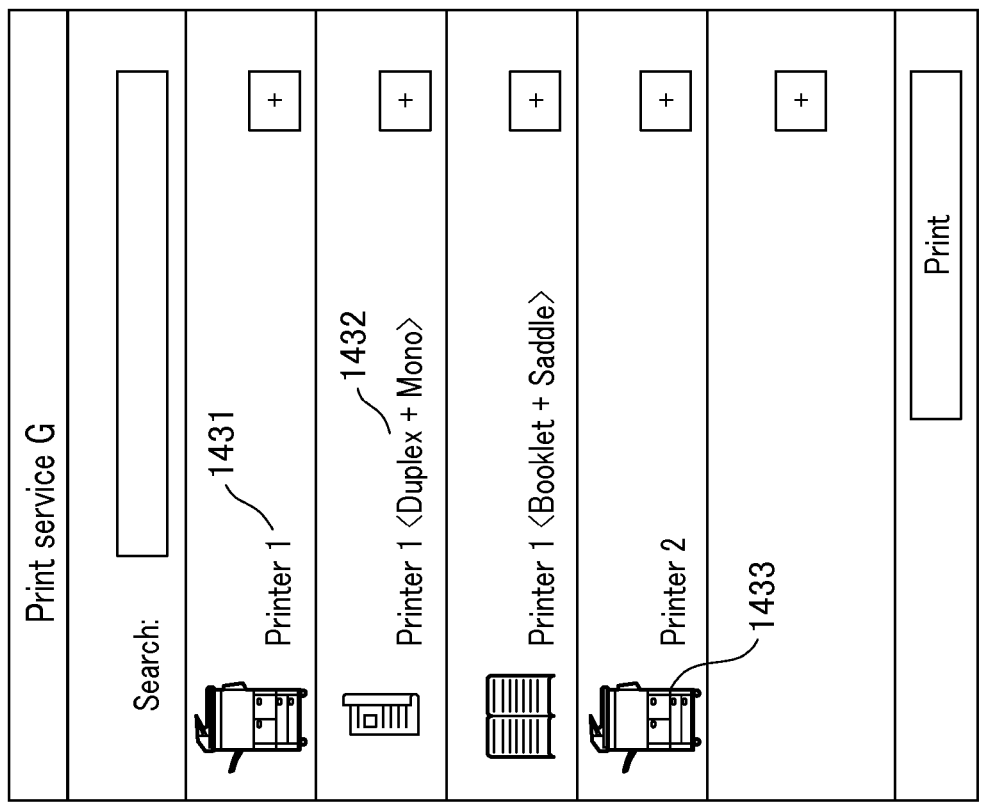
FIG. 16C2
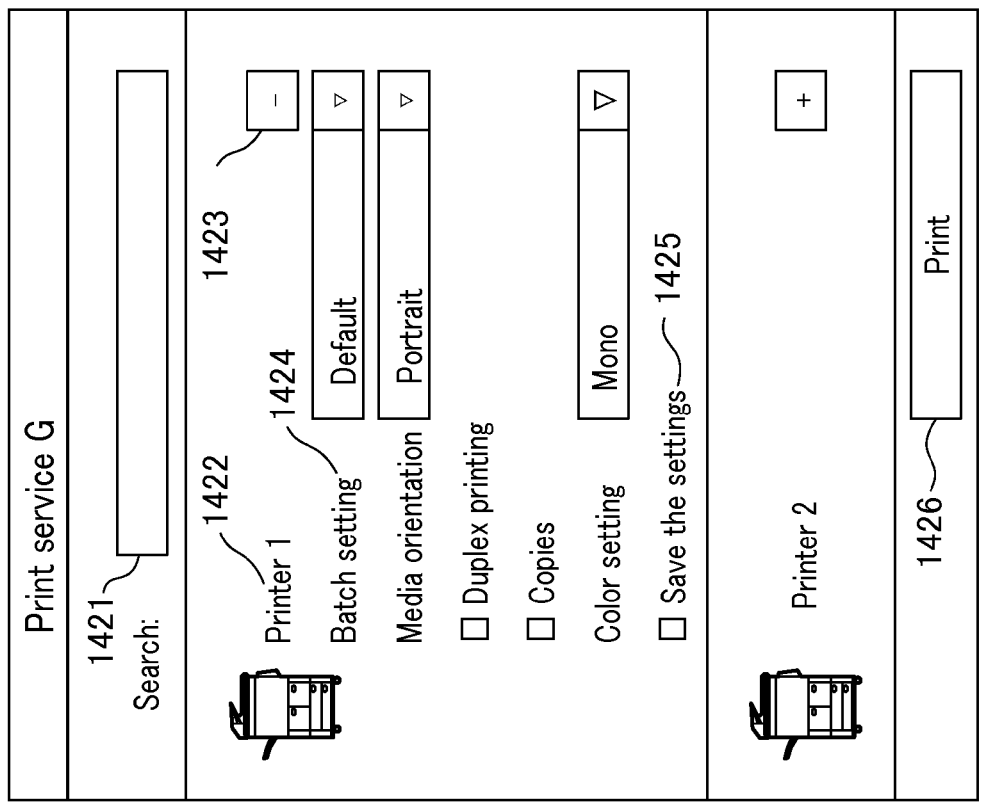

PRINT SYSTEM, RELAY SERVER, PROCESSING DEVICE, PRINT SYSTEM CONTROL METHOD, AND STORAGE MEDIUM FOR COLLECTIVELY SETTING PRINT ITEMS

BACKGROUND OF THE INVENTION

1. Field of the Invention

The present invention relates to a print system, a relay server, a processing device, a print system control method, and a storage medium.

2. Description of the Related Art

A content print system in which a print instruction is transmitted from a client to a server and the server received the print instruction converts the content to be printed into print data has been proposed. A cloud computing has been attracting attention as one of system configurations for providing service from a server to a client.

A main feature of the cloud computing is that data conversion and data processing are executed in a distributed manner using many computing resources so that requests from many clients are processed in a simultaneous manner. At present, too many vendors provide various types of services by realizing Web services on a cloud computing environment (hereinafter referred to as "cloud") that realizes the cloud computing.

Among vendors who provide services on a cloud computing environment, Google (registered trademark) is a notable vendor. Google (registered trademark) not only establishes many large-scale data centers so as to provide services in cooperation with devices but also develops a data communication structure between devices and services. For example, Google (registered trademark) has developed a data communication structure for providing services in cooperation with image forming devices and has disclosed an interface for providing data communication between the cloud computing environment prepared by Google (registered trademark) and image forming devices. In this system, the image forming device receives a print request from a service and executes printing. A Web application polls the service to thereby acquire a change in the print status.

Japanese Patent Laid-Open No. 2003-196054 discloses a method in which a print instruction and information for controlling printing are received from a client in a service allowing a server to generate print data, and a server generates print data based on the information for controlling printing. With the aid of the method, a user who is a client can transmit print data suitable for an image forming device without installing any printer driver on his/her PC.

However, in the method disclosed in Japanese Patent Laid-Open No. 2003-196054, it may be difficult for a server (e.g., print service) to provide an appropriate print setting. In general, a print service generates a print setting screen based on capability information about an image forming device (capabilities or the like to be described below), where the capability information is represented in XML format or the like. In other words, a print service reads a function which can be provided to a user as print settings from capability information about an image forming device, and represents the read function on a general purpose screen. Thus, when the number of print setting items is many because of an image forming device with multi-function capability, the setting items are not displayed in a hierarchical manner or in a group on a print setting screen provided by a print service to a user. Consequently, considerable time and labor are required for a user to read the screen and make a setting thereon. Also, when the print service cannot execute the "prohibition processing" for print settings, a user himself needs to select a combination of setting items so as not to cause any unnecessary conflict, resulting in a burden on the user.

In order to eliminate considerable time and labor of a user or a burden on a user upon making such print settings described above, a method for making print settings using a batch setting function may be contemplated. In the print setting method using a batch setting function, a print service displays previously-prepared composite settings as print items for a batch setting function on a print setting screen. In other words, the print service displays a batch setting screen. When a user selects print items for the desired batch setting function on a batch setting screen, the print service collectively changes the settings of the print items. However, when the print service is not batch setting function-enabled, the print service cannot provide a batch setting screen to a user.

SUMMARY OF THE INVENTION

The present invention provides a print system that collectively sets print items depending on the capabilities of a print service even if the print service is not batch setting function-enabled.

According to an aspect of the present invention, a print system is provided that includes a print service server that provides a print setting screen to a user device, receives print settings set by a user via the provided print setting screen, and generates a print job based on the received print settings; and an information processing device that is capable of communicating with the print service server. The information processing device includes a registration unit configured to transmit printer information including the print settings to the print service server and register the printer information in the print service server; and a reception unit configured to receive a request for realizing a batch setting in the print service server in which a plurality of print settings is settable in a collective manner, wherein when the reception unit has received the request, the registration unit registers batch setting printer information regarding the same printer as that corresponding to the printer information and corresponds to the setting content of the batch setting, in addition to the printer information in the print service server. Also, the print service server includes a generation unit configured to generate a printer selection screen on which a printer corresponding to each of the printer information and the batch setting printer information is selectable as a result of the registration of both the printer information.

Further features of the present invention will become apparent from the following description of exemplary embodiments with reference to the attached drawings.

BRIEF DESCRIPTION OF THE DRAWINGS

FIGS. 12A to 12E are diagrams illustrating information to be stored in devices.

FIGS. 13B1 to 13E3 are diagrams illustrating information to be stored in devices.

FIGS. 14A to 14C1 are diagrams illustrating examples of notification information to be reported by devices.

FIGS. 15D to 15G are diagrams illustrating examples of another notification information to be reported by devices.

FIGS. 16A to 16C2 are diagrams illustrating an UI for composite settings and an UI for print settings.

DESCRIPTION OF THE EMBODIMENTS

First Embodiment

Figure 1:
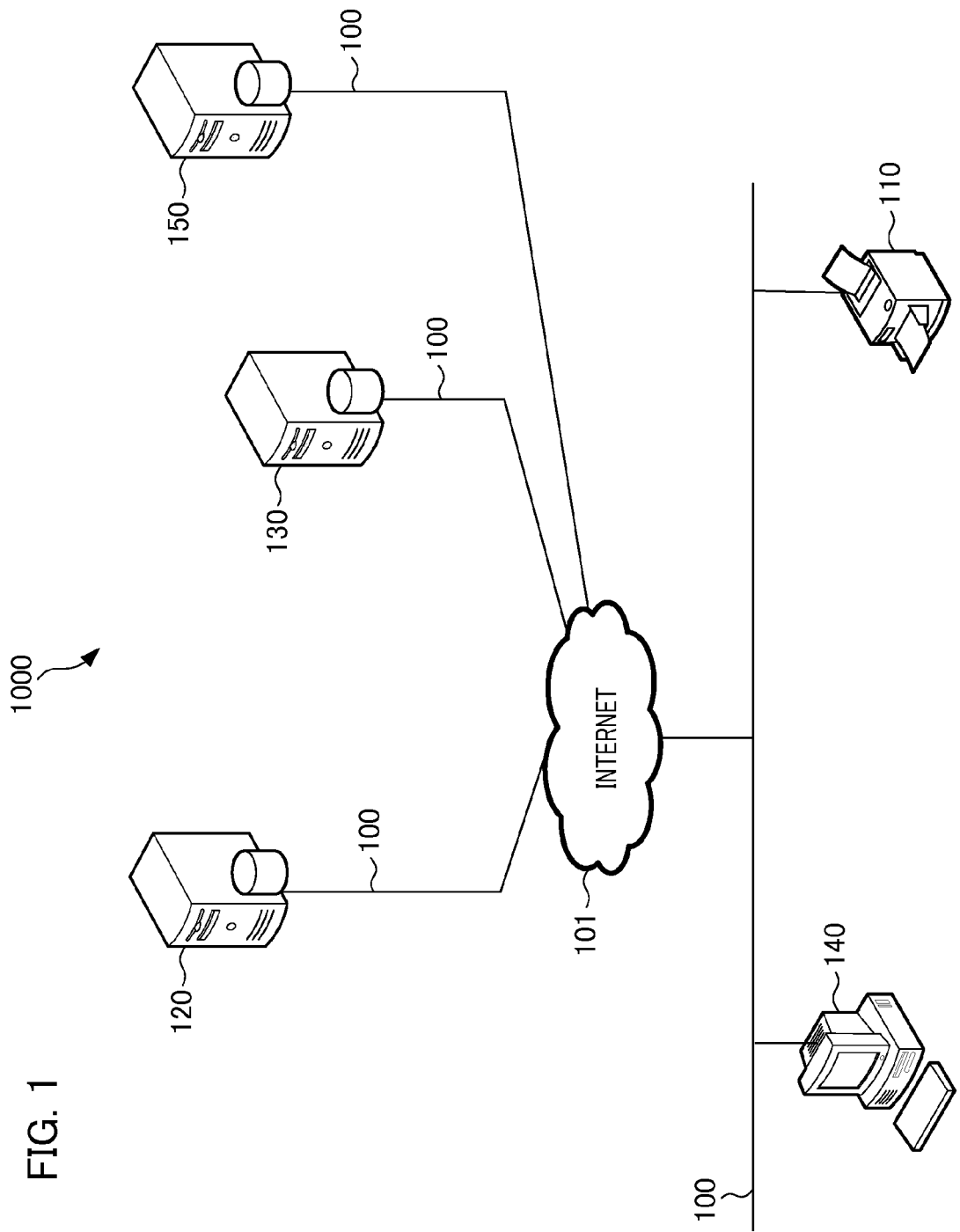
FIG. 1 is a diagram illustrating an example of a system configuration according to a first embodiment.

FIG. 1 is a diagram illustrating the configuration of a print system 1000. The print system 1000 includes a client 140 and an image forming device 110. The client 140 and the image forming device 110 are devices that are arranged on a user environment and is communicably connected to each other via a network 100. The network 100 is connected to Internet 101.

Also, the print system 1000 includes a Web application server group 150 and a print server group 130. Both server groups may also be server groups provided by the same vendor. In this case, both server groups may also be connected to each other via the network 100. The print system 1000 also includes a print relay server 120. The print relay server 120 is connected to the network 100 and the network 100 is connected to the Internet 101. In the present embodiment, the image forming device 110 and the print relay server 120 collectively function as an information processing device that executes print relation processing for printing a print job. Devices and server groups constituting the print system 1000 are connectable to each other via the Internet 101 and can perform data communication with each other. The number of devices is only one shown in FIG. 1, but may be in plural. The number of server groups is in plural, but may be one.

Figure 2:
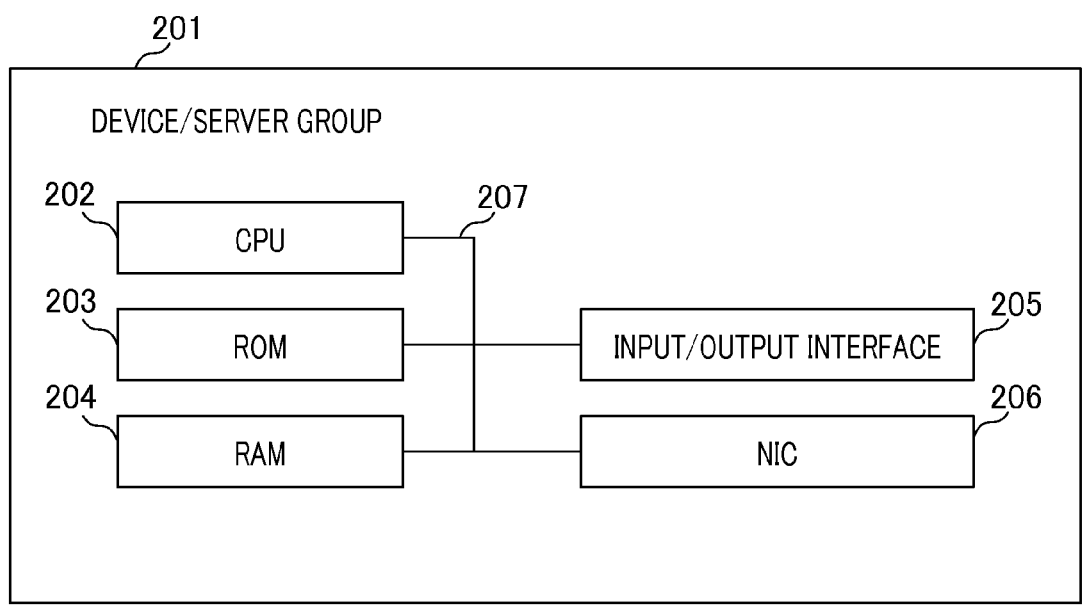
FIG. 2 is a diagram illustrating the hardware configuration of devices and server groups constituting a print system.

FIG. 2 is a diagram illustrating an example of the hardware configuration of each device and each server constituting the print system 1000. Devices 201 constitute the print system 1000. A CPU (Central Processing Unit) 202 is a unit that executes various programs and realizes various functions.

A ROM (Read Only Memory) 203 is a unit that stores various programs. A RAM (Random Access Memory) 204 is a storage unit that functions as a temporal working storage region for the CPU 202. The CPU 202 loads a program stored in the ROM 203 into the RAM 204 to thereby execute a program. An Input/Output interface 205 transmits data to a display (not shown) connected to each device and each server group.

Also, the Input/Output interface 205 receives data from a pointing device (not shown). An NIC (Network Interface Card) 206 connects the devices constituting the print system 1000 to the network 100. The units can receive/transmit data via a bus 207.

Also, the image forming device 110 includes a print unit (not shown). The print unit can receive/transmit data from/to the units via the bus 207. The print unit is a unit that can print a raster image on a recording medium.

Figure 3:
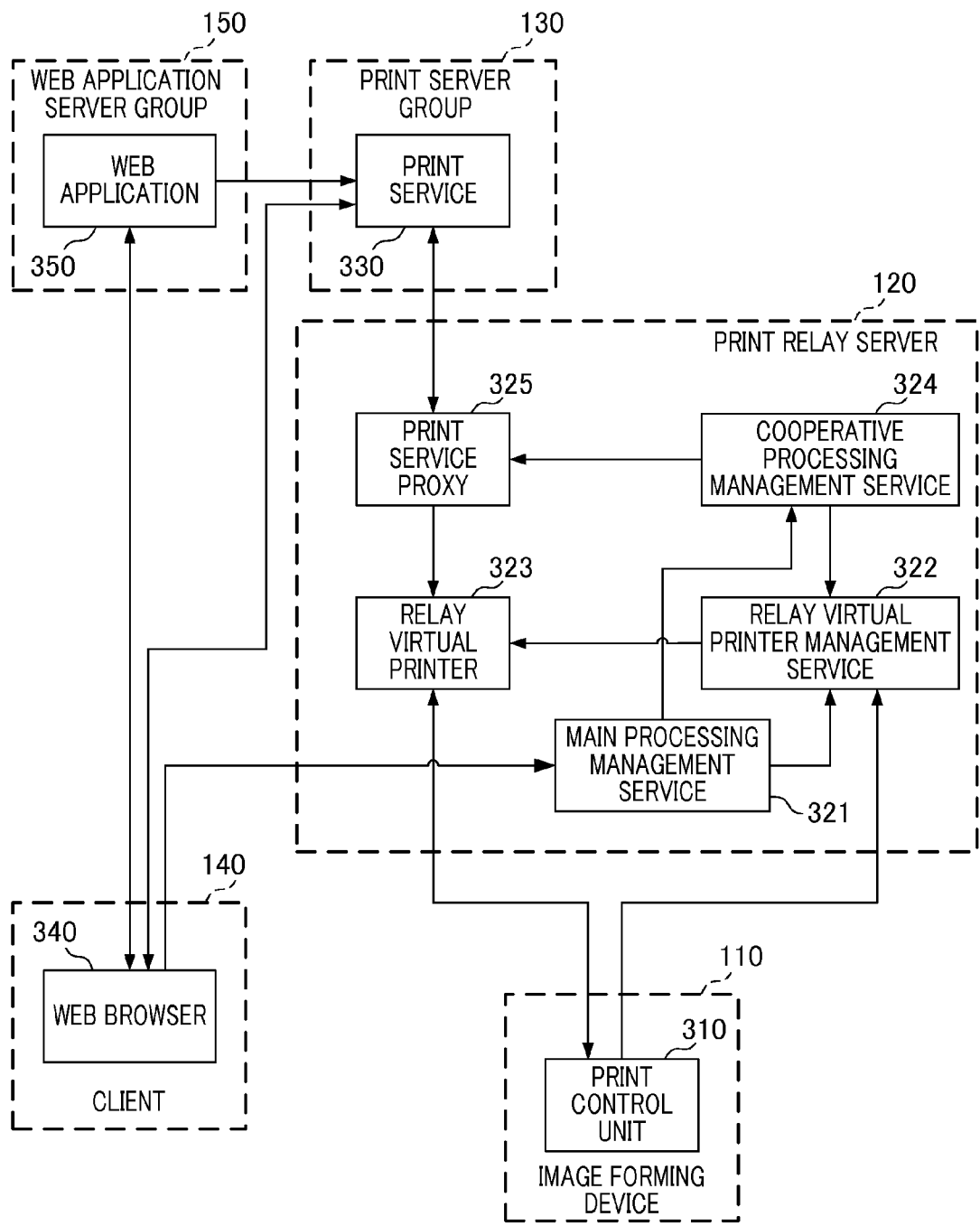
FIG. 3 is a diagram illustrating the software configuration of devices and server groups constituting a print system.

A description will be given of the functions provided by each device and each server. FIG. 3 is a functional block diagram illustrating an example of the software configuration of devices constituting the print system 1000. Programs for realizing the functions of software shown in FIG. 3 are stored in the ROMs 203 of the devices and servers. the CPU 202 loads programs into the RAM 204 and executes the programs to thereby realize the functions.

Hereinafter, a description will be given of the functions realized by the devices and server groups. The functions are largely divided into two parts: a first half and a second half. Firstly, the function to be described in the first half is a basic function consisting of three systems provided by each device and each server group. Next, the function to be described in the second half is the development function, which is specific to the present invention, for realizing a batch setting function based on the basic function consisting of the three systems.

A feature of the basic function to be described in the first half is that an image forming device having a print setting specified value is registered in a print service and a user changes print settings as required for each function to thereby instruct printing. A feature of the development function to be described in the second half is that previously-prepared composite settings are registered in a print service so as to be an option for a batch setting function and a user selects the batch setting to thereby instruct printing.

Firstly, a description will be given of the basic function consisting of three groups in the first half. The function classified into a first group is a function classified into a preliminary registration in which the image forming device 110 is registered in the print relay server 120 and a relay virtual printer 323 is realized within the print relay server 120.

The function classified into a second group is a function classified into a final registration in which the relay virtual printer 323 managed by the print relay server 120 is registered in a print service 330 (print service device) via a print service proxy 325.

The function classified into a third group is a function classified into a print that causes the image forming device 110 to print out the print data generated by the print server group 130 via the print relay server 120.

A description will be given of the function of the preliminary registration serving as the first group. Firstly, a description will be given of the function classified into the preliminary registration system for the image forming device 110. The image forming device 110 has a print control unit 310. The print control unit 310 registers the image forming device 110, which is being operated by a user, by a user's screen operation.

Figure 4:
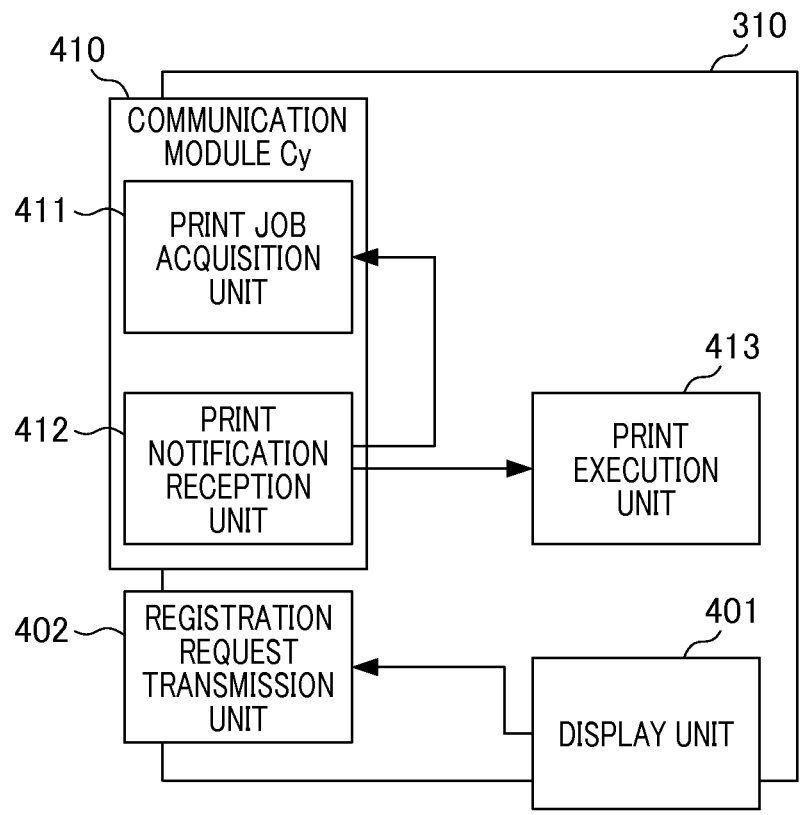
FIG. 4 is a functional block diagram illustrating an example of a print control unit.

The print control unit 310 shown in FIG. 4 includes a display unit 401, a registration request transmission unit 402, a print job acquisition unit 411, a print notification reception unit 412, and a print execution unit 413. Also, the print control unit 310 includes a communication module Cy 410. The display unit 401 displays various screens. In the preliminary registration, the display unit 401 firstly displays an UI (User Interface) as exemplified in FIG. 11A. A user can provide an instruction for registering the image forming device 110 in the print relay server 120 via the UI. Although the UI shown in FIG. 11A displays a user ID 1101 and a password 1102 as an input screen, the UI shown in FIG. 11A may also be arranged such that the URL and the IP address of the print relay server 120 can be input. The image forming device 110 can be registered in any print relay server as long as the URL and the IP address thereof can be input. In the first embodiment, an internally recorded value is intended to be used as an URL and an IP address.

The registration request transmission unit 402 instructs the print relay server 120 to execute registration. When a user inputs the user ID 1101 and the password 1102 and presses down a registration execution button 1103 to log-in the print relay server 120, the registration request transmission unit 402 receives input information from the display unit 401. The registration request transmission unit 402 firstly logs-in the print relay server 120 using the received input information. If the log-in is successful, the registration request transmission unit 402 transmits registration information about the image forming device 110 to the print relay server 120. Note that a registration instruction may be provided not only from the image forming device 110 but also from the print relay server 120 as described below. Other functions of the print control unit 310 will be described below.

Next, a description will be given of registration information. Registration information includes an RPID (Real Printer ID) that is unique identification information assigned to the image forming device 110. Unique identification information is assigned to each of the image forming devices 110, and thus, the print relay server 120 specifies each image forming device based on unique identification information. In the first embodiment, the location for placement of a printer can be specified by specifying the RPID.

Also, registration information includes the printer name of the image forming device 110. The printer name is a name assigned to the image forming device 110 and is used for calling the image forming device 110. Unlike identification information, the printer names of the image forming devices 100 may be the same.

Also, registration information includes capabilities. Capabilities are information indicating the capabilities of the image forming device 110. Capabilities include, for example, information indicating whether or not the image forming device 110 can perform duplex printing, information indicating whether or not the image forming device 110 can perform color printing, and information about the size of a paper sheet which can be output. Capabilities can be represented in XML format as shown in FIG. 14A. Each parenthesis <Item> shown in FIG. 14A indicates the capabilities of the image forming device 110. In this example, it indicates that the image forming device 110 can perform duplex printing, color printing, and can output sheets of paper with the size of B5, A4, and A3. In this example, it also indicates that the image forming device 110 can select layout (normal, 2 up, booklet) and stapling (none, upper left, saddle).

Registration information also includes a print setting initial value. The print setting initial value can be represented in XML format as shown in FIG. 14B and is the subset of FIG. 14A. In other words, the print setting initial value indicates that which <Item> is selected from among information included in capabilities. In the example shown in FIG. 14B, it means that one-sided output, color printing, A4 size, normal layout, and no stapling are set.

Next, a description will be given of the function classified into the preliminary registration for the print relay server 120. As shown in FIG. 3, the print relay server 120 includes a main processing management service 321, a relay virtual printer management service 322, a relay virtual printer 323, a cooperative processing management service 324, and a print service proxy 325.

Figure 5:
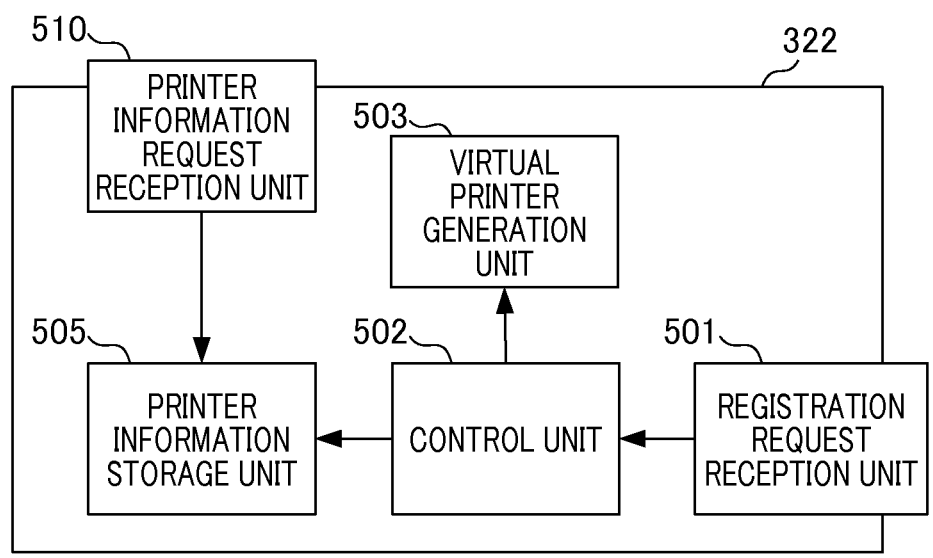
FIG. 5 is a functional block diagram illustrating an example of a relay virtual printer management service.

A description will be given of the function of the relay virtual printer management service 322 with reference to FIG. 5. The relay virtual printer management service 322 includes a registration request reception unit 501, the control unit 502, a virtual printer generation unit 503, a printer information storage unit 505, and a printer information request reception unit 510.

The registration request reception unit 501 receives the registration information transmitted by the registration request transmission unit 402 of the image forming device 110. The control unit 502 acquires the registration information received by the registration request reception unit 501, and interprets the registration information. The control unit 502 instructs the virtual printer generation unit 503 to generate the relay virtual printer 323.

Figure 6:
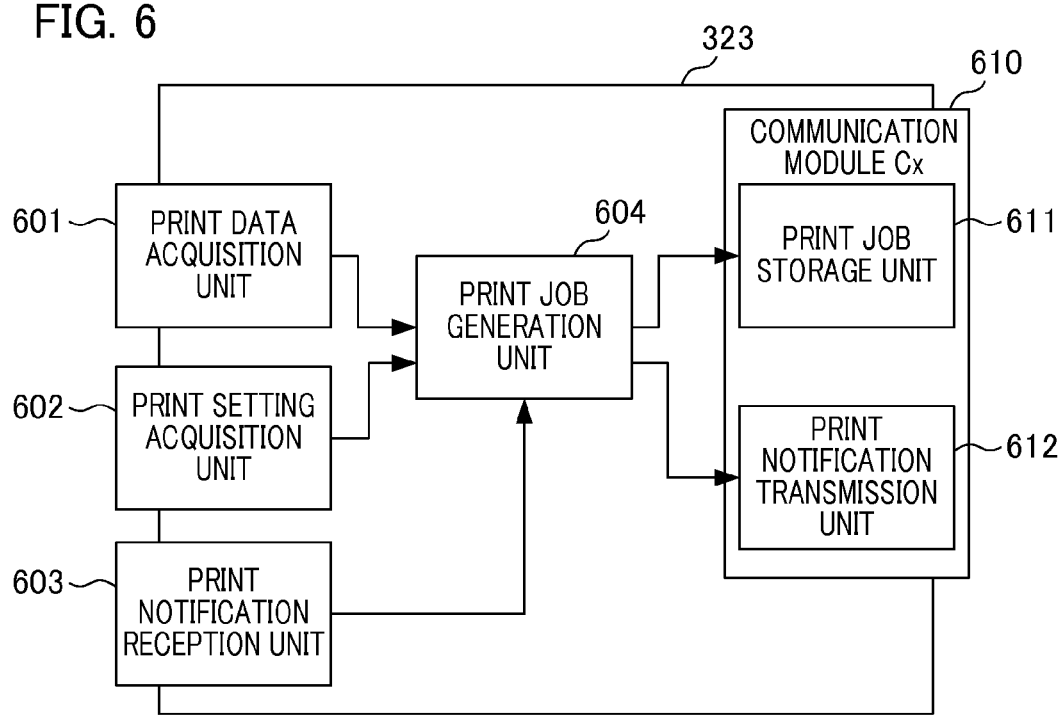
FIG. 6 is a functional block diagram illustrating an example of a relay virtual printer.

The virtual printer generation unit 503 has a communication module Cx 610 shown in FIG. 6 which conforms to the communication system with the image forming device 110 of interest. The communication module Cx 610 is an interface for communicating with the image forming device 110 and can communicate with the communication module Cy 410 provided in the image forming device 110 described above.

The virtual printer generation unit 503 realizes a process (thread) into which the communication module has been loaded. The process corresponds to the relay virtual printer 323 that realizes the functions shown in FIG. 6. In addition to the communication module, the relay virtual printer 323 has a function for acquiring print data by receiving a print notification and a function for generating a print job from the print data. The details of the functions will be described below.

When the virtual printer generation unit 503 realizes the relay virtual printer 323, the virtual printer generation unit 503 issues a VPID (Virtual Printer ID) that is identification information for identifying the realized relay virtual printer 323. The virtual printer generation unit 503 transmits the issued VPID to the control unit 502. The virtual printer generation unit 503 realizes the relay virtual printer 323 each time registration information is transmitted from the image forming device 110 and assigns the VPID, i.e., a unique identifier to each of the realized relay virtual printers 323. In the first embodiment, the control unit 502 can specify the relay virtual printer 323 by specifying the VPID.

The printer information storage unit 505 stores various types of information by associating them with each other. The control unit 502 that has acquired the VPID from the virtual printer generation unit 503 instructs the printer information storage unit 505 to store the VPID. Then, the printer information storage unit 505 stores the VPID and registration information in the management table as shown in FIG. 12A by associating them with each other. The management table shown in FIG. 12A stores a printer VPID 1201, an RPID 1202, a printer name 1203, capabilities 1204, and a print setting initial value 1205.

The above-described function is the function classified into the preliminary registration that registers the image forming device 110 in the print relay server 120 to thereby realize the relay virtual printer 323 in the print relay server 120.

Next, a description will be given of the function classified into a final registration serving as a second group. Firstly, a description will be given of the function classified into the final registration for the print relay server 120. The main processing management service 321 provided in the print relay server 120 is a common processing unit with a Web browser 340 independent of the print service 330. The main processing management service 321 performs pre-processing for registering the relay virtual printer 323 in a print service in accordance with the instruction given by a user.

Figure 7:
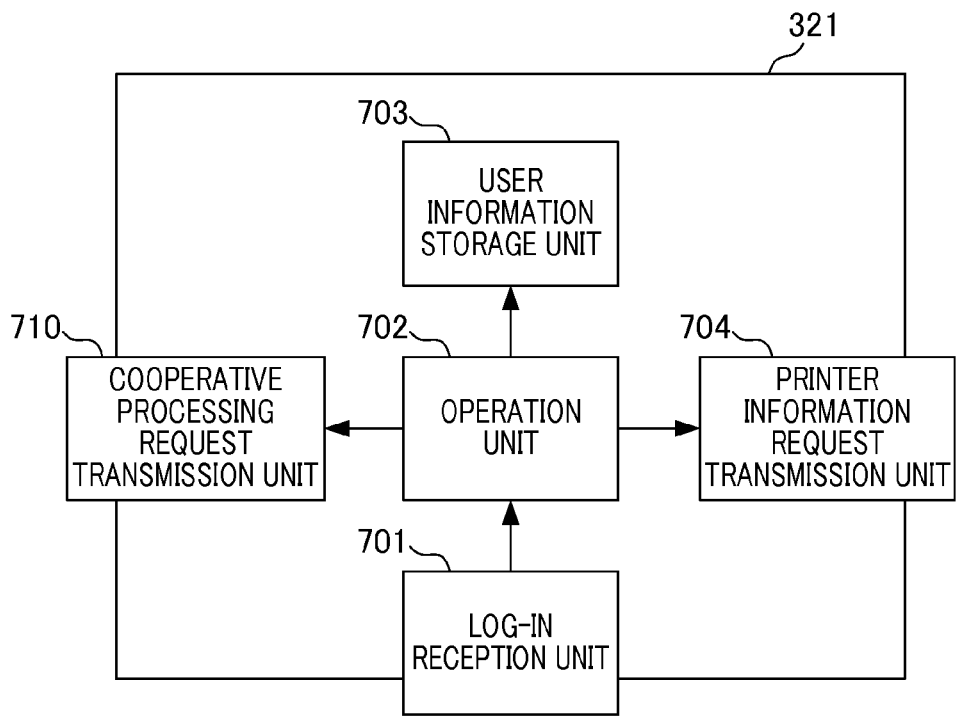
FIG. 7 is a functional block diagram illustrating an example of a main processing management service.

A description will be give of the function of the main processing management service 321 with reference to FIG. 7. The main processing management service 321 includes a log-in reception unit 701, an operation unit 702, a user information storage unit 703, a printer information request transmission unit 704, and a cooperative processing request transmission unit 710.

The log-in reception unit 701 receives a log-in by the client 140 via the Web browser 340. When the user authentication is completed, processing is performed depending on the logged-in user account. The operation unit 702 generates a screen for receiving a user operation as exemplified in FIG. 11B and causes the Web browser 340 to display the screen. The operation unit 702 generates a screen based on information set for each user. On the screen shown in FIG. 11B, the list of printers 1111 that function as image forming devices available for the relevant user are displayed and a print setting change button 1112 is arranged for each printer. Also, an addition/deletion button 1113 for managing a printer available for the relevant user is arranged on the screen. A print service vendor list 1114 and a cooperation button 1115 for bringing a printer in cooperation with each print service are also displayed on the screen.

Figure 11B:
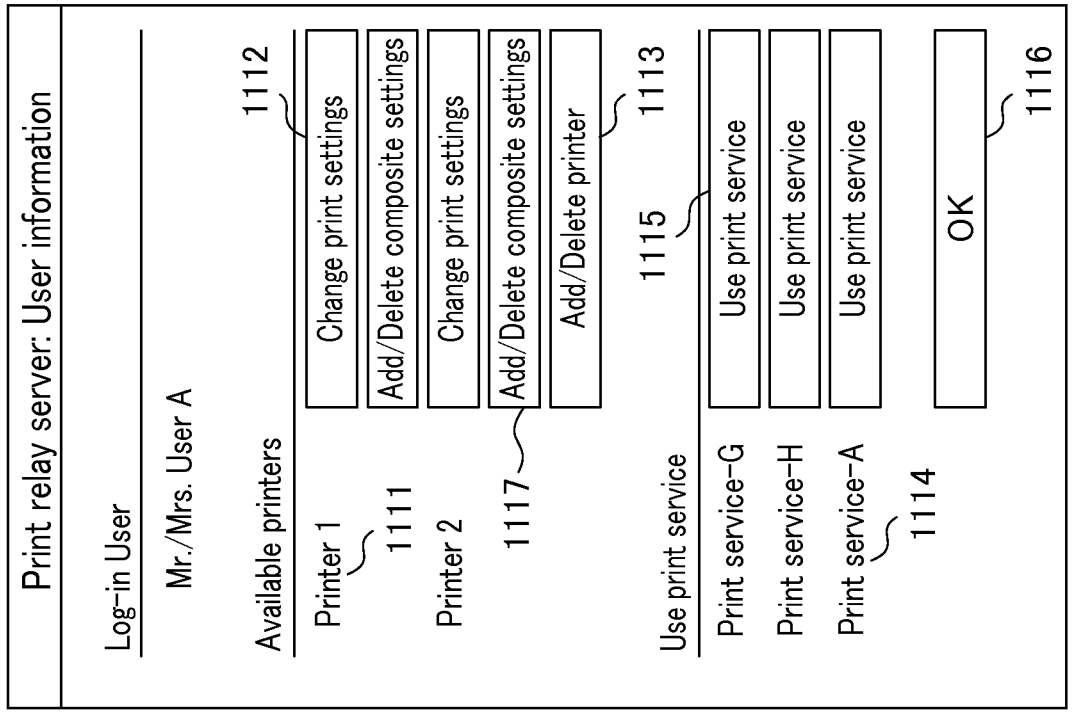
FIGS. 11A to 11D are diagrams illustrating an example of a UI displayed on a Web browser.
Figure 11A:
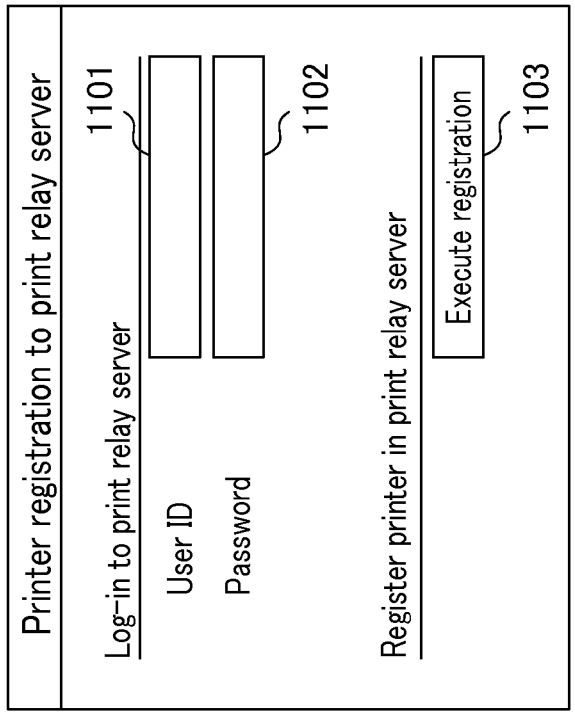
Figure 11D:
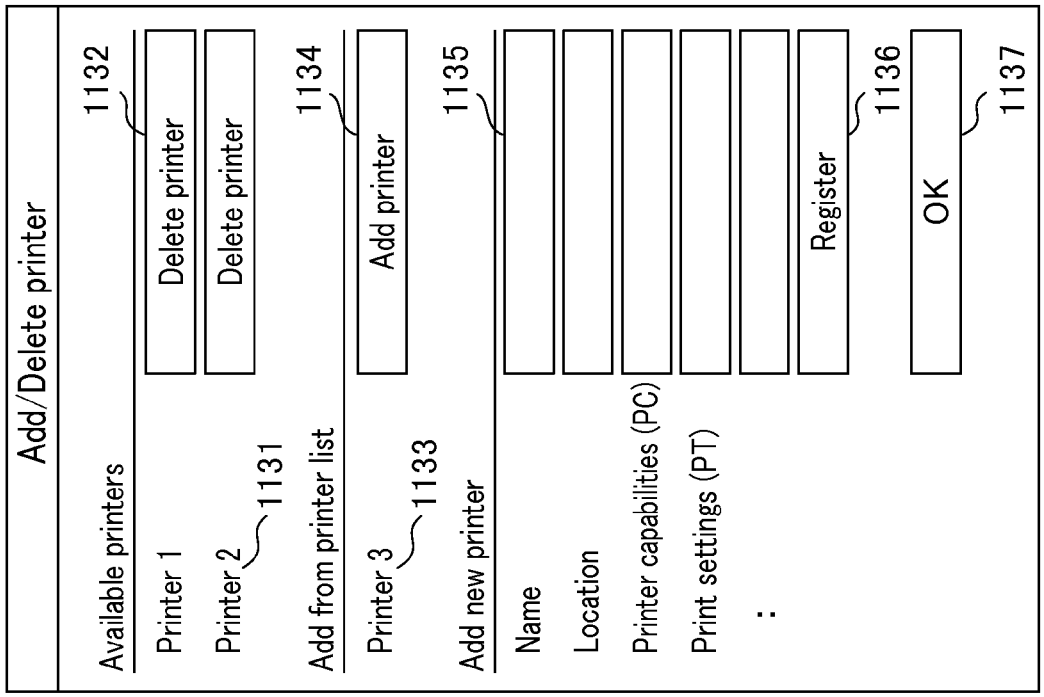

When a user presses down the addition/deletion button 1113, the operation unit 702 causes the Web browser 340 to display a printer addition/deletion screen as exemplified in FIG. 11D. In FIG. 11D, a printer list 1131 which is already available for a user and a deletion button 1132 for deleting a printer are displayed. A printer list 1133 which is available for the print relay server 120 and to which a user can make a use request and an addition button 1134 for making an addition request are also displayed. An information input column 1135 for newly registering a printer in the print relay server 120 and a registration execution button 1136 are also displayed. The information input column 1135 and the registration execution button 1136 are provided to perform processing equivalent to that performed by the registration request transmission unit 402 of the image forming device 110 on the server operation screen.

When a user determines an available printer, the operation unit 702 instructs the user information storage unit 703 to associate the user ID, the VPID for identifying the available printer, and each of the print settings with each other and store them in the management table as shown in FIG. 12B. The information to be stored includes a user ID 1211, a VPID 1212, and a print setting specified value 1213 for each VPID. When a user adds/deletes a printer, the VPID 1212 linked to the user ID 1211 increases/decreases. The print setting specified value 1213 is a specified value upon making print settings by selecting a printer from an application.

Also, the initial value for the print setting specified value 1213 is the print setting initial value 1205 stored in the management table shown in FIG. 12A. Information will be acquired as follows. Firstly, the operation unit 702 instructs the printer information request transmission unit 704 to request printer information to the relay virtual printer management service 322. At this time, the operation unit 702 passes the VPID of the image forming device 110 about which information needs to be acquired. The printer information request reception unit 510 of the relay virtual printer management service 322 receives the request from the printer information request transmission unit 704. The printer information request reception unit 510 acquires information about the image forming device 110 shown in FIG. 12A associated with the received VPID from the printer information storage unit 505. In other words, the printer information request reception unit 510 acquires the print setting initial value 1205. The printer information request reception unit 510 transmits the acquired print setting initial value 1205 back to the printer information request transmission unit 704, and the printer information request transmission unit 704 passes the acquired information to the operation unit 702. By means of the foregoing processing, the print setting initial value 1205 is acquired.

When a user presses down an OK button 1137 on the screen shown in FIG. 11D, an available printer is confirmed and the screen shown in FIG. 11D returns to the screen shown in FIG. 11B. On the screen, display of available printer(s) is updated. By means of the foregoing processing, the main processing management service 321 can manage a printer available for each user.

When a user presses down the print setting change button 1112 displayed on the UI shown in FIG. 11B, the operation unit 702 instructs the printer information request transmission unit 704 to request printer information to the relay virtual printer management service 322. The printer information request reception unit 510 of the relay virtual printer management service 322 receives a request including the VPID of a printer about which printer information needs to be acquired. The printer information request reception unit 510 acquires printer information shown in FIG. 12A associated with the received VPID from the printer information storage unit 505. In other words, the printer information request reception unit 510 acquires the capabilities 1204. The printer information request reception unit 510 transmits the acquired information to the printer information request transmission unit 704, and the printer information request transmission unit 704 transmits the acquired information to the operation unit 702.

Also, the operation unit 702 passes the VPID of a printer to the user information storage unit 703 to request printer information. Here, it is assumed that the print setting specified value 1213 managed by the management table shown in FIG. 12B is acquired from the user information storage unit 703. As described above, the capabilities 1204 and the print setting specified value 1213 of the selected printer are acquired.

Figure 11C:
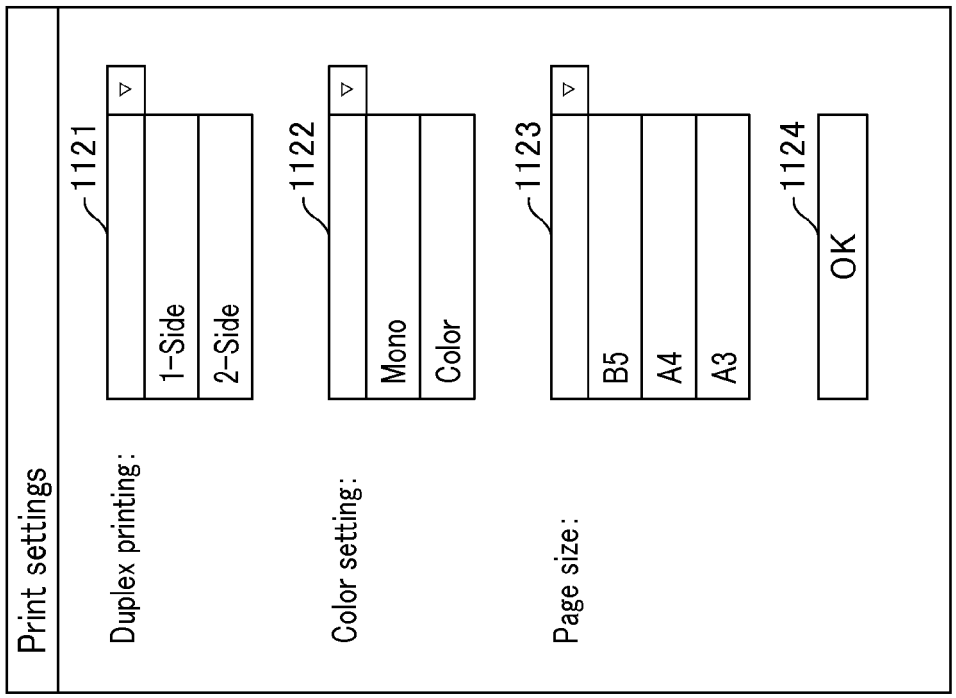

Next, the operation unit 702 generates a print setting screen exemplified in FIG. 11C and causes the Web browser 340 to display the print setting screen. Here, the operation unit 702 generates setting items and their options based on the acquired capabilities. Also, the acquired print setting specified values are applied to the initial settings.

When a user changes print settings via an UI screen, the set value is held in XML format as shown in FIG. 14C. According to the XML format exemplified in FIG. 14C, two-sided output, monochrome output, and A4 size are set. Note that the initial values are simply set for the set values for layout and stapling not shown in FIG. 11C. When a user presses down an OK button 1124, print settings are established, and the operation unit 702 transmits the XML in which the print settings are held and the VPID of the relevant printer to the user information storage unit 703. The user information storage unit 703 updates the print setting specified value 1213 of the relevant printer selected by the relevant user to the received set value. As described above, the main processing management service 321 can manage print settings for each printer for each user so that the same printer can have a different specified value for each user.

When a user presses down the cooperation button 1115 displayed on the UI shown in FIG. 11B, the operation unit 702 instructs the cooperative processing request transmission unit 710 to perform cooperative processing. The cooperative processing request transmission unit 710 transmits a cooperative processing request for cooperating with the selected print service to a cooperative processing request reception unit 801 of the cooperative processing management service 324. At this time, the user ID of a user, the list of VPIDs corresponding to printers available for the user, and printer information associated with each VPID are transmitted to the cooperative processing request reception unit 801. In other words, information associated with the VPID to be transmitted includes the printer name 1203, the capabilities 1204 managed by the printer information storage unit 505, and the print setting specified value 1213 managed by the user information storage unit 703. When a user presses down an OK button 1116, the process ends and the screen can return to the previous screen. A composite setting addition/deletion button 1117 shown in FIG. 11B will be described below.

Figure 8:
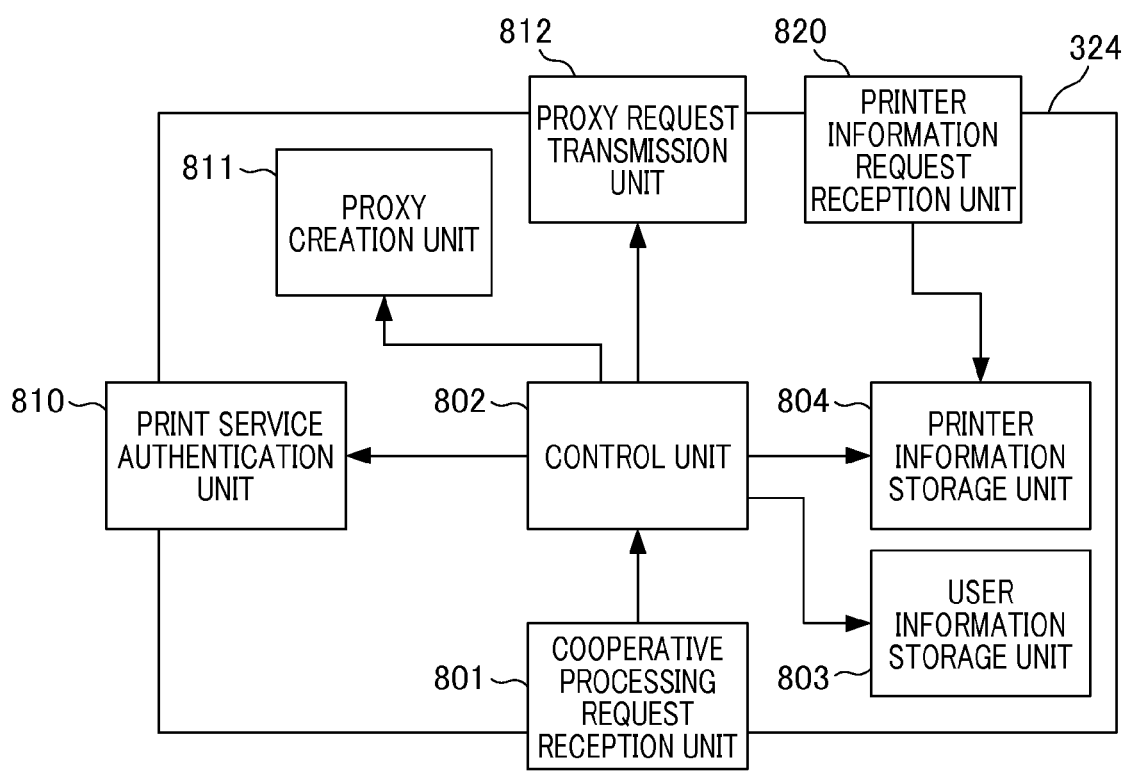
FIG. 8 is a functional block diagram illustrating an example of a cooperative processing management service.

Next, a description will be given of the function classified into the final registration for the cooperative processing management service 324 provided in the print relay server 120. The cooperative processing management service 324 shown in FIG. 8 includes a cooperative processing request reception unit 801, a control unit 802, a user information storage unit 803, and a printer information storage unit 804. Also, the cooperative processing management service 324 includes a print service authentication unit 810, a proxy creation unit 811, a proxy request transmission unit 812, and a printer information request reception unit 820. The cooperative processing management service 324 is present for each print service and creates a process having an interface corresponding to the communication system with the print service. In the present embodiment, the print service proxy 325 is generated as the process. Also, the cooperative processing management service 324 manages information required for communication and print execution.

The cooperative processing request reception unit 801 receives a cooperative processing request from the cooperative processing request transmission unit 710. Here, the cooperative processing request reception unit 801 receives a printer name, capabilities, and print settings as information included in the cooperative processing request. The cooperative processing request reception unit 801 transmits the received information to the control unit 802. The control unit 802 interprets the received information. The control unit 802 instructs the user information storage unit 803 to confirm whether or not there is a user ID corresponding to information managed by the user information storage unit 803. The details of information managed by the user information storage unit 803 will be described below.

If there is no user ID, it means that the user uses the print service in the first time, the user authentication is performed for the print service 330 of the print server group 130 of interest. Here, the control unit 802 instructs the print service authentication unit 810 to log-in the print server group 130. Here, the user inputs a user account (ID and password) for accessing the print service on the log-in screen displayed by the Web browser 340 by the print service 330. If the user authentication is successful, the print service authentication unit 810 receives an authentication token from the print server group 130 and passes the authentication token to the control unit 802. If the user authentication is failed, it means that the user cannot use the print service. The cooperative processing request reception unit 801 returns the status of the failure to the cooperative processing request transmission unit 710 of the main processing management service 321.

Figure 9:
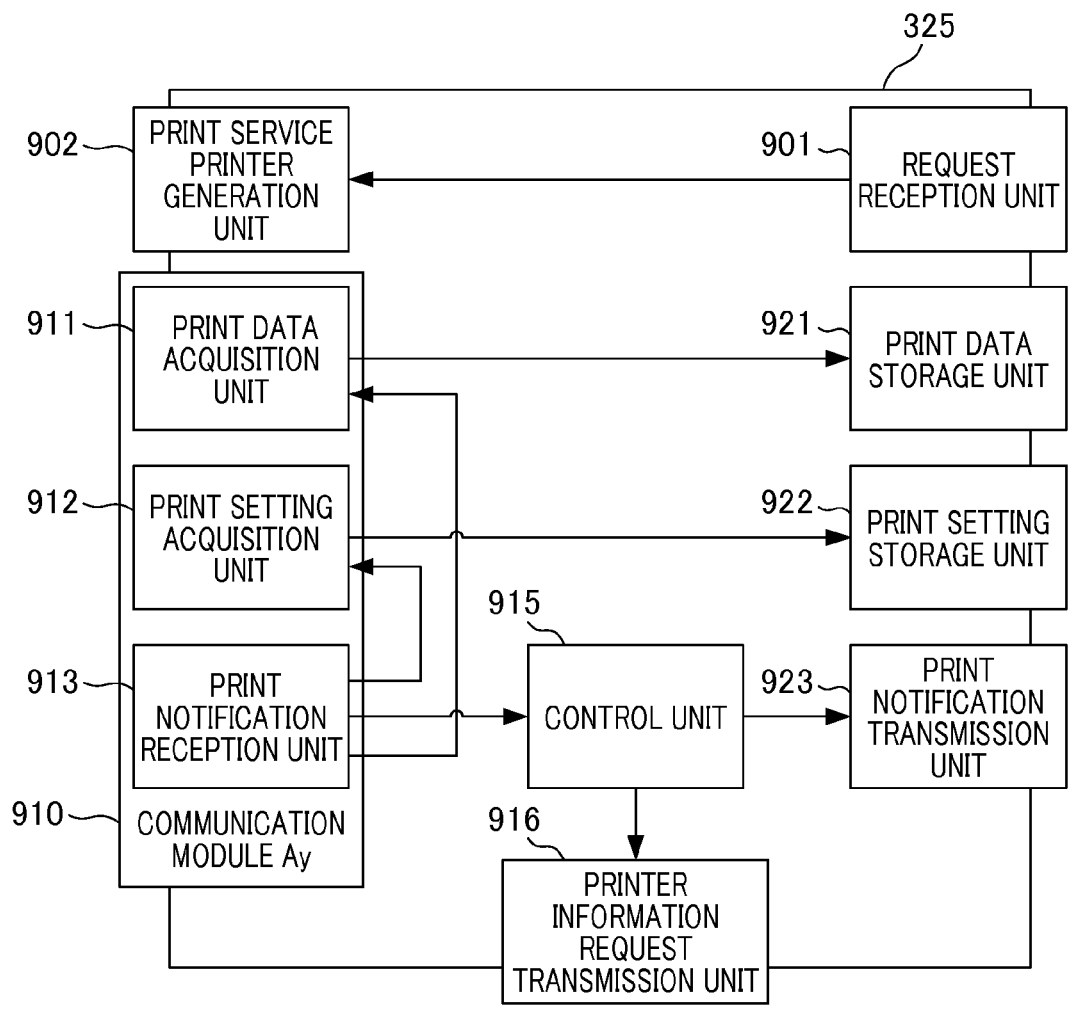
FIG. 9 is a functional block diagram illustrating an example of a print service proxy.

Next, the proxy creation unit 811 creates the print service proxy 325 by receiving an instruction from the control unit 802. The print service proxy 325 realizes the functions shown in FIG. 9. The proxy creation unit 811 has a communication module Ay 910 which conforms to the communication system with the print service of interest. The communication module Ay 910 is an interface for communicating with the print server group 130 and can communicate with a communication module Ax 1010 provided in the print service 330 to be described below. The proxy creation unit 811 realizes a process (thread) into which the communication module has been loaded. The process corresponds to the print service proxy 325. In addition to the communication module, the print service proxy 325 has a function for registering a printer in a print service 330 and a function for passing the print data and print settings acquired from a print service to another module. The details of the functions of the print service proxy 325 will be described below.

Upon realization of the print service proxy 325, the proxy creation unit 811 issues a proxy ID that is identification information for identifying the realized print service proxy 325. The proxy creation unit 811 transmits the issued proxy ID to the control unit 802. The print service proxy 325 is realized for each user ID and the proxy ID serving as unique identification information is assigned to each of the realized print service proxies. In the present embodiment, the control unit 802 can specify the print service proxy 325 by specifying the proxy ID. Note that the print service 330 may issue a proxy ID. At this time, the proxy ID received from the print service 330 is managed.

After creation of the print service proxy 325, the control unit 802 instructs the proxy request transmission unit 812 to make a printer registration request. The proxy request transmission unit 812 requests the print service proxy 325 to register the image forming device 110 in the print service 330. At this time, the proxy request transmission unit 812 transmits a user's authentication token, a proxy ID, a VPID list, and relevant information thereof to the print service proxy 325. As described below, when printer registration processing is performed, the print service proxy 325 also receives an SPID (Service Printer ID) corresponding to each VPID as first printer identification information from the print service 330. In the present embodiment, the print service proxy 325 also transmits support information to the proxy request transmission unit 812 at this time. The details of SPID and support information will be described below. The proxy request transmission unit 812 that has received the SPID list transmits the information back to the control unit 802.

As described above, when the proxy creation unit 811 and the proxy request transmission unit 812 finish processing, the control unit 802 acquires the generated proxy ID of the print service proxy 325 and an SPID list corresponding to the VPIDs registered in the print service 330. The user information storage unit 803 receives an instruction from the control unit 802, associates a user ID and a proxy ID and relevant information that were transmitted to the print service 330, and are managed by the print relay server 120 with each other and stores them in the management table shown as in FIG. 12C by associating them with each other. The management table shown in FIG. 12C includes a user ID 1221, a proxy ID 1222, and a VPID list 1223 available for the user. Also, the printer information storage unit 804 receives an instruction from the control unit 802, associates an SPID, a VPID, and relevant information with each other, and stores them in the management table as shown in FIG. 12D. In other words, the printer information storage unit 804 functions as a storage unit that associates print settings and printer information with each other and stores them. The management table shown in FIG. 12D is managed as first printer information and includes an SPID 1231, a VPID 1232, a printer name 1233, capabilities 1234, and a print setting specified value 1235.

Next, a description will be given of the function classified into the final registration for the print service proxy 325 provided in the print relay server 120. The print service proxy 325 includes a request reception unit 901, a print service printer generation unit 902, a print data acquisition unit 911, a print setting acquisition unit 912, and a print notification reception unit 913. Also, the print service proxy 325 includes a control unit 915, a printer information request transmission unit 916, a print data storage unit 921, a print setting storage unit 922, and a print notification transmission unit 923.

The print service proxy 325 is a process having a communication interface corresponding to the communication system with the print service 330. For each print service, the print service proxy 325 is generated for each user account by a proxy creation unit of the cooperative processing management service 324, which is present for each print service. Then, the generated print service proxies 325 are independently connected to the print service 330 so that all users are simultaneously connected to all print services. Here, processing for registering a printer in the print service 330 is performed. Hereinafter, a description will be given of the function of the print service proxy 325 with reference to FIG. 9.

The request reception unit 901 receives a printer registration request, a user's authentication token, a proxy ID, a VPID list, and relevant information thereof from the proxy request transmission unit 812. The request reception unit 901 instructs the print service printer generation unit 902 to perform registration processing. The print service printer generation unit 902 is connected to the print service 330 using the received authentication token, and the connection is continued. Next, the print service printer generation unit 902 makes a printer registration request to the print service 330 based on the received information. FIG. 15D shows an example of printer registration request information to the print service 330. Information described in XML format includes a printer name 1341, a proxy ID 1342, capabilities 1343, and print settings 1344. Here, printer information for one unit of a printer is described but printer information for multiple units of a printer may also be described for a single request. In other words, the print service printer generation unit 902 functions as a registration unit that transmits printer information including print settings to the print service 330 and registers the printer information in a print service device.

The print service printer generation unit 902 receives an SPID from the print service 330 as a response to a registration request. FIG. 15E shows an exemplary response described in XML format, where the corresponding SPID 1351 is assigned to each printer. Here, response information with respect to one printer is described but response information with respect to a plurality of printers may also be described for a single response. At this time, the print service 330 may also pass support information, which is information relating to its own service capability, including a Java (registered trademark) script operating environment, a print setting, a batch setting, and the like to the print service proxy 325. The print service printer generation unit 902 transmits the received SPID or support information back to the request reception unit 901, and the request reception unit 901 transmits the information back to the proxy request transmission unit 812. In the present embodiment, support information about a print service is intended to be stored in the user information storage unit 703 of the main processing management service 321. Other functions will be described below.

Next, a description will be given of the function classified into the final registration for the print server group 130. The print server group 130 has the print service 330. The print server group 130 virtualizes a plurality of servers as a single server, and realizes the function of the print service 330 by means of the single server. The print server group 130 activates a plurality of virtual machines in the single server, and causes each virtual machine to realize the function of the print service 330. The print service 330 shown in FIG. 3 is just one of them.

Figure 10:
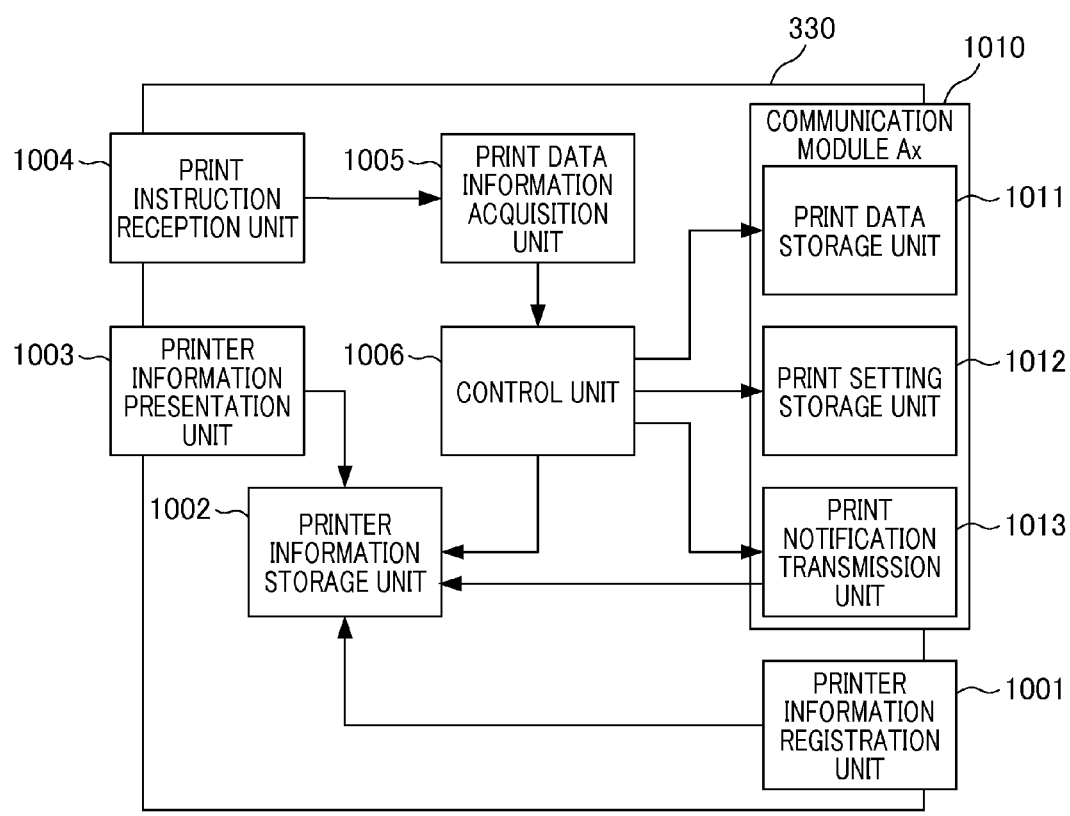
FIG. 10 is a functional block diagram illustrating an example of a print service.

The print service 330 receives printer registration, and creates a service printer(s) selectable from an application. Hereinafter, a description will be given of the function of the print service 330 with reference to FIG. 10. The print service 330 includes a printer information registration unit 1001, a printer information storage unit 1002, a printer information presentation unit 1003, a print instruction reception unit 1004, a print data information acquisition unit 1005, and a control unit 1006. Also, the print service 330 includes a print data storage unit 1011, a print setting storage unit 1012, and a print notification transmission unit 1013.

The printer information registration unit 1001 receives a printer registration request and relevant information thereof from the print service printer generation unit 902. The printer information registration unit 1001 creates a service printer corresponding to each of the image forming devices 110, on which the registration request has been made, based on the received information, and issues an SPID corresponding to each service printer.

The SPID (Service Printer ID) is identification information that is issued by the print service 330 in order to identify a printer upon receipt of a printer registration request. When a printer of the print service 330 is selected upon printing, the print service 330 identifies the printer using an SPID corresponding to the selected printer. The printer information registration unit 1001 transmits the issued SPID to the printer information storage unit 1002 and the print service printer generation unit 902 of the print service proxy 325.

The printer information storage unit 1002 stores a user ID of the print service 330, an SPID, a printer name, a proxy ID, capabilities, and print settings in the management table as shown in FIG. 12E by associating them with each other. FIG. 12E is a diagram illustrating information stored in the printer information storage unit 1002. The management table shown in FIG. 12E includes a user ID 1241, an SPID 1242, a printer name 1243, a proxy ID 1244, capabilities 1245, and a print setting specified value 1246. When printer registration is performed from an interface having a different proxy ID, information managed by UserB@xxx.com exemplified in FIG. 12E is managed such that it can be determined that image forming device 110 is registered from which print service proxy 325. The above-described function is the function classified into the final registration that registers the relay virtual printer 323 managed by the print relay server 120 in the print service 330 via the print service proxy 325.

Next, a description will be given of the function classified into the print. Firstly, a description will be given of the function provided with the client 140. The client 140 has the Web browser 340. The Web browser 340 transmits a print instruction for the content stored in the Web application server group 150 to the Web application server group 150. Also, the Web browser 340 receives a command (i.e., redirection instruction) for accessing the print server group 130 from the Web application server group 150, and accesses the print server group 130 in accordance with the received redirect instruction. Also, the Web browser 340 acquires a list of printers available for a user who uses the Web browser 340 from the accessed print server group 130 to thereby display the list. Also, the Web browser 340 acquires a print setting screen corresponding to the printer selected from the list by the user from the print server group 130 to thereby display the print setting screen. FIG. 11C shows an exemplary print setting screen corresponding to the printer selected by a user, where the print setting screen is displayed by the Web browser 340. Also, the Web browser 340 transmits a print setting value set by a user on the print setting screen to the print server group 130.

Next, a description will be given of the function provided by the Web application server group 150. The Web application server group 150 has a Web application 350. The Web application server group 150 virtualizes a plurality of servers as a single server, and realizes the function of the Web application 350 by means of the single server. The Web application server group 150 activates a plurality of virtual machines in the single server, and causes each virtual machine to realize the function of the Web application 350.

The Web application 350 provides a document creation service. When a user wishes to distribute, for example, a material at the company's conference, the user uses the document generation service for creating the material. When the client 140 uses the Web application 350, there is no need to install the Web application 350 on the client 140 but the client 140 may only have the Web browser 340. The Web application 350 transmits screen information required for creating the material to the Web browser 340.

The Web application 350 performs authentication based on user information including the user ID and the password both input by a user via the Web browser 340, and sends screen information required for creating a material in response to the success of authentication. The Web browser 340 that has received the screen information displays a creation screen for creating a document based on the screen information and a user creates a material to be distributed at the conference using the creation screen. The Web application 350 receives information about the material created by a user using the creation screen, creates content based on the received information, and causes the storage device (not shown) for the Web application server group 150 to store the created content. Note that the Web application 350 provides not only a document creation service but also a mail service and a schedule service.

A user who wishes to print the content created by using a document generation service presses down a print button (not shown) displayed on the creation screen. The Web application 350 receives information indicating that the print button has been pressed down, and transmits a command for accessing the print server group 130 (i.e., a redirect instruction) to the Web browser 340. A redirect instruction includes a request for acquiring a list corresponding to users who are using the Web browser 340, content identification information for identifying a content to which a print instruction has been given by a user, and user information. Also, when a content acquisition request is made from the print server group 130, the Web application 350 transmits the content of interest to the print server group 130 based on content identification information for identifying a content sent together with the content acquisition request.

Next, a description will be given of the function classified into the print for the print server group 130. The print server group 130 has the print service 330. The print service 330 acquires print data from the Web application 350 and transmits the print data to a printer or a module having an interface conforming thereto to thereby execute print processing. Hereinafter, a description will be given of the print function of the print service 330 with reference to FIG. 10.

The printer information presentation unit 1003 receives a list acquisition request from the Web browser 340. The printer information presentation unit 1003 specifies SPIDs and printer names stored in the printer information storage unit 1002 based on a User ID 1241 serving as user information. Then, the printer information presentation unit 1003 generates a list of image forming devices 110 available for a user based on the SPIDs and the printer names, and transmits the list to a Web browser.

When a user selects the image forming device 110 from the list, the printer information presentation unit 1003 receives the SPID of the image forming device 110 selected by the user from the list. The printer information presentation unit 1003 specifies capabilities stored in the printer information storage unit 1002 based on the received SPID, generates a print setting screen, and transmits the generated print setting screen to the Web browser 340. Also, the printer information presentation unit 1003 specifies a print setting specified value stored in the printer information storage unit 1002 based on the received SPID and set it as the initial setting value.

The printer information storage unit 1002 generates the print setting screen shown in FIG. 11C based on information about capabilities shown in FIG. 12E. As shown in FIG. 11C, the printer information storage unit 1002 generates a print setting screen in which only the print settings described in capabilities are selectable.

The print instruction reception unit 1004 receives the print settings set by a user via the print setting screen and the SPID from the Web browser 340. Also, when the Web browser 340 accesses the print instruction reception unit 1004 based on the redirect instruction, the print instruction reception unit 1004 receives content identification information for identifying content to which a print instruction has been given by a user.

The print data information acquisition unit 1005 receives content identification information from the print instruction reception unit 1004, and acquires the content to be printed from the Web application 350 based on the received content identification information. Also, the print data information acquisition unit 1005 receives print settings input by a user and an SPID corresponding to the printer selected by the user from the print instruction reception unit 1004. Note that the print data information acquisition unit 1005 may convert the content into print data as appropriate based on the content and print settings acquired from the Web application 350.

The control unit 1006 acquires print data, print settings, and an SPID from the print data information acquisition unit 1005. The print settings are described in XML format as shown in FIG. 14C. As can be seen from FIG. 14C, a duplex setting, a monochrome setting, and paper size A4 are set by a user.

The communication module Ax 1010 can communicate with a device having the communication module Ay 910 and is an interface for data communication between two devices. The communication module Ax 1010 has the print data storage unit 1011, the print setting storage unit 1012, and the print notification transmission unit 1013. The print data storage unit 1011 receives print data from the control unit 1006 and stores the print data. The print setting storage unit 1012 receives print settings from the control unit 1006 and stores the print settings. The control unit 1006 instructs the print notification transmission unit 1013 to send notification information in response to the reception indicative of the completion of storage from the print data storage unit 1011 and the print setting storage unit 1012.

In response to the instruction to transmit the notification information from the control unit 1006, the print notification transmission unit 1013 acquires the storage location of print data and the storage location of print settings from the control unit 1006, and generates notification information A. The notification information A is described in XML format as shown in FIG. 15F and includes an SPID 1361, a storage location 1362 of print data, and a storage location 1363 of print settings. Also, the print notification transmission unit 1013 acquires an SPID from the control unit 1006, and specifies a proxy ID based on the information stored in the printer information storage unit 1002. The print notification transmission unit 1013 transmits the notification information A for informing the fact that print data for the SPID managed by the proxy is ready to the interface having the specified proxy ID.

Next, a description will be given of the function classified into the print for the print relay server 120. A description will be given of the function classified into the print for the print service proxy 325 with reference to FIG. 9. The print service proxy 325 has the communication module Ay 910. The print notification reception unit 913 of the communication module Ay 910 receives the notification information A transmitted from the print notification transmission unit 1013. Since the relay virtual printer 323 is registered in the print service 330 via the print service proxy 325, the notification information A is transmitted to the communication module Ay 910 of the print service proxy 325. Since the communication module Ay is a module that is a one-to-one correspondence with the communication module Ax, the print notification reception unit 913 is capable of interpreting the notification information A.

The print notification reception unit 913 instructs the control unit 915 to determine a printer for output. Firstly, the control unit 915 acquires the SPID 1361 of the service printer shown in FIG. 15F from the notification information A. Next, the control unit 915 requests the printer information request transmission unit 916 to acquire a VPID value corresponding to the SPID. The printer information request transmission unit 916 requests the printer information request reception unit 820 of the cooperative processing management service 324 to acquire printer information corresponding to the SPID. Upon receiving the request, the printer information request reception unit 820 acquires printer information including a VPID associated with the designated SPID from the printer information storage unit 804, and transmits the printer information back to the printer information request reception unit 820. The printer information request reception unit 820 transmits the information back to the printer information request transmission unit 916. The printer information request transmission unit 916 acquires a VPID value from among the acquired information, and transmits the VPID value to the control unit 915. The control unit 915 transmits the acquired VPID to the print notification transmission unit 923. The print notification transmission unit 923 specifies the relay virtual printer 323 to which data is to be transmitted from the acquired VPID.

Also, the print notification reception unit 913 confirms the storage location of print data and the storage location of print settings both described in the notification information A, and notifies the print data acquisition unit 911 and the print setting acquisition unit 912 of these information. The print data acquisition unit 911 acquires print data from the print data storage unit 1011 based on the notified storage location of print data, and instructs the print data storage unit 921 to store the print data. The print data storage unit 921 in which the print data is stored notifies the print notification transmission unit 923 of the storage location. Also, the print setting acquisition unit 912 acquires print settings from the print setting storage unit 1012 based on the notified storage location of print settings, and instructs the print setting storage unit 922 to store the print settings. The print setting storage unit 922 in which the print settings are stored notifies the print notification transmission unit 923 of the storage location.

The print notification transmission unit 923 generates notification information B in response to the reception of indicative of the completion of storage from the print data storage unit 921 and the print setting storage unit 922. The notification information B can be represented in XML format as shown in FIG. 15G. The notification information B includes a storage location 1371 of print data and a storage location 1372 of print settings. The print notification transmission unit 923 transmits the notification information B to the print notification reception unit 603 of the relay virtual printer 323 specified by the control unit 915. The notification information B corresponds to a second specification which is used for communication between the print service proxy 325 and the relay virtual printer 323. The print service proxy 325 and the relay virtual printer 323 are present in the print relay server 120 and communication can be made between any combinations thereof. Here, the second specification is an internal format of the print relay server 120 but is a highly versatile format because the implementation of the print service proxy 325 and data format to be treated greatly depend on the print service 330. The print notification transmission unit 923 and the print notification reception unit 603 correspond to a second communication unit.

A description will be given of the function classified into the print for the relay virtual printer 323 with reference to FIG. 6. The print notification reception unit 603 receives the notification information B from the print notification transmission unit 923. The print notification reception unit 603 confirms the storage location of print data and the storage location of print settings both described in the notification information B, and notifies a print data acquisition unit 601 and a print setting acquisition unit 602 of these storage location information.

The print data acquisition unit 601 acquires print data from the print data storage unit 921 based on the notified storage location of print data. The print setting acquisition unit 602 acquires print settings from the print setting storage unit 922 based on the notified storage location of print settings.

A print job generation unit 604 receives print data from the print data acquisition unit 601 and receives print settings from the print setting acquisition unit 602 and then generates a print job depending on the capabilities and the print settings of the image forming device 110. Here, the capabilities of the image forming device 110 include information about a print data format interpretable by the image forming device 110 and information indicating whether or not the image forming device 110 itself can download data from the designated location. This is described in the capabilities 1204 among the printer information managed by the relay virtual printer management service 322. Thus, if the print data received by the print data acquisition unit 601 can be interpreted by the image forming device 110, the received print data may be set as a print job without conversion.

The print job generation unit 604 stores the generated print job in a print job storage unit 611, and notifies a print notification transmission unit 612 of the storage location. The print notification transmission unit 612 generates notification information C including the storage location, and transmits the notification information C to the image forming device 110. The communication module Cy 410 corresponding to the communication module Cx 610 is implemented in the image forming device 110.

A description will be given of the function classified into the print for the image forming device 110 with reference to FIG. 4. The print control unit 310 of the image forming device 110 receives print data from the relay virtual printer 323, and executes printing. The print control unit 310 has the communication module Cy 410. The print notification reception unit 412 of the communication module Cy 410 receives the notification information C transmitted from the print notification transmission unit 612. Since the communication module Cy is a module that is a one-to-one correspondence with the communication module Cx, the print notification reception unit 412 is capable of interpreting the notification information C. The specification defined by a device vendor in order to perform data communication between the relay virtual printer 323 and the image forming device 110 corresponds to a third specification that can be handled by the device vendor. The interface of the communication module Cx and the communication module Cy is an interface that is created in accordance with the third specification. The print notification transmission unit 612 corresponds to a third communication unit.

The print notification reception unit 412 confirms the storage location of a print job described in the notification information C, and notifies the print job acquisition unit 411 of the information. The print job acquisition unit 411 acquires a print job from the print job storage unit 611 based on the notified storage location of a print job. The print notification reception unit 412 transmits the print job acquired by the print job acquisition unit 411 to the print execution unit 413, and instructs the print execution unit 413 to execute printing. The print execution unit 413 that has received the instruction instructs a print unit to output the received print job. The above description has been given of the function classified into the print in which print data generated by the print server group 130 is printed by the image forming device 110 via the print relay server 120.

Next, a description will be given of a process classified into the preliminary registration, a process classified into the final registration, and a process classified into the print with reference to sequence diagrams shown in FIG. 18, FIG. 19, FIG. 20, and FIG. 21. As the first process, a description will be given of preliminary registration processing for realizing the relay virtual printer 323 in the print relay server 120 by registering the image forming device 110 in the print relay server 120 with reference to FIG. 18.

In step S1601, a user performs an operation for registering a printer in the relay virtual printer management service 322 from the display unit 401 of the image forming device 110. In step S1602, the registration request transmission unit 402 of the print control unit 310 requests the registration request reception unit 501 of the relay virtual printer management service 322 to register a printer. In step S1603, the virtual printer generation unit 503 receives a printer registration request from the registration request reception unit 501 via the control unit 502, and realizes the relay virtual printer 323 based on registration information included in the registration request.

In step S1604, the relay virtual printer 323 transmits a response indicating successful creation to the relay virtual printer management service 322. In step S1605, the virtual printer generation unit 503 of the relay virtual printer management service 322 issues a VPID for identifying the created relay virtual printer 323. In step S1606, the printer information storage unit 505 stores the VPID and printer registration information associated therewith as a management table via the control unit. The management table corresponds to the table shown in FIG. 12A, and the printer information storage unit 505 associates the VPID with the RPID, its name, capabilities, and the like, and manages them. In step S1607, the registration request reception unit 501 of the relay virtual printer management service 322 notifies the registration request transmission unit 402 of the print control unit 310 of the fact that printer registration has been completed. In step S1608, the registration request transmission unit 402 instructs the display unit 401 of the image forming device 110 to display the indication that printer registration has been completed. The above description has been given of the first preliminary registration processing.

Figure 19:
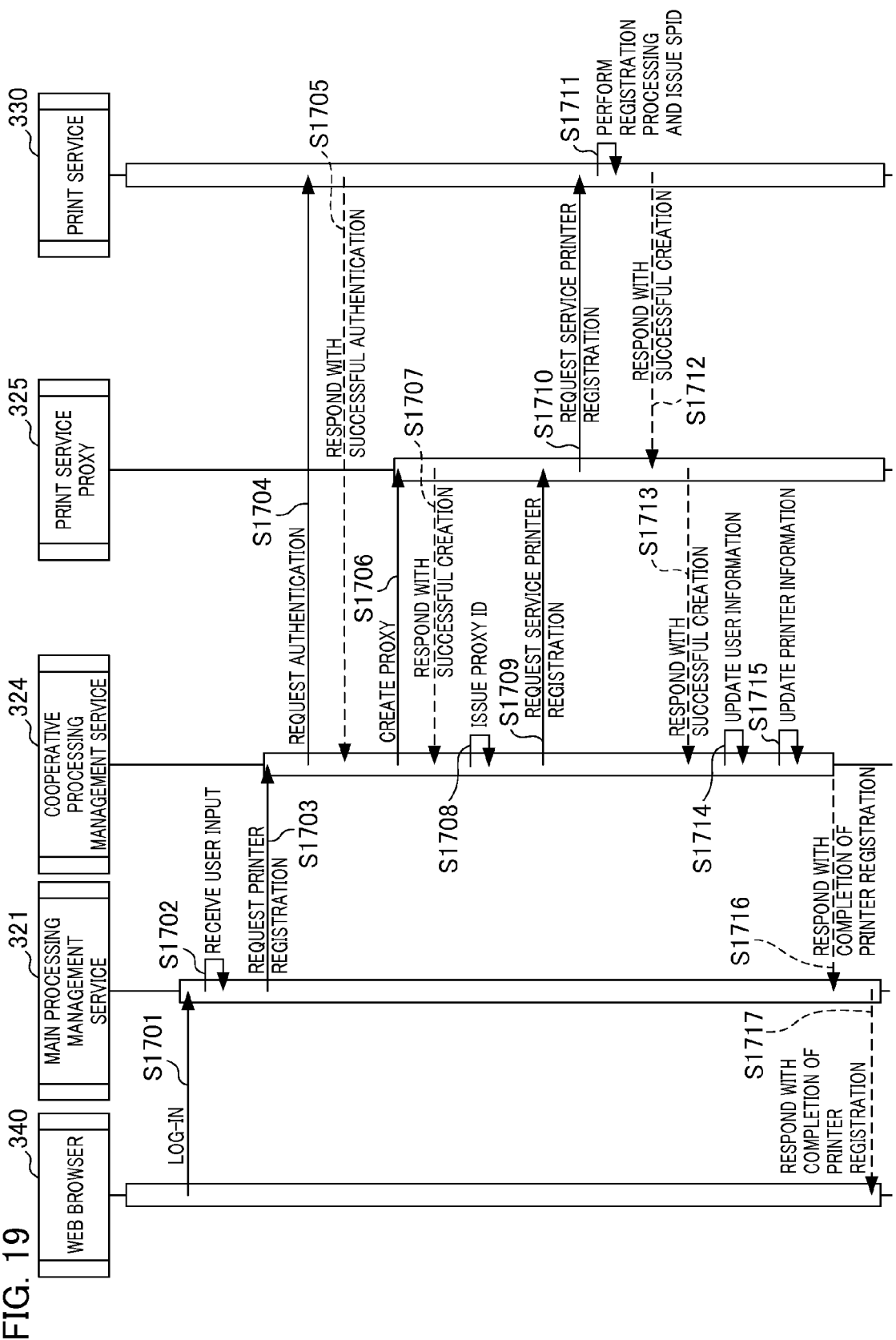
FIG. 19 is a diagram illustrating final registration processing for registering a relay virtual printer in a print service.

Next, as the second process, a description will be given of final registration processing for registering the relay virtual printer 323 managed by the print relay server 120 in the print service 330 via the print service proxy 325 with reference to FIG. 19. In step S1701, a user logs-in the main processing management service 321 of the print relay server 120 via the Web browser 340. In step S1702, the log-in reception unit 701 of the main processing management service 321 receives a user's operation via the created UI and then receives printer information including print settings for the print service 330 and a printer registration request. In step S1703, the cooperative processing request transmission unit 710 transmits the request for registering a printer in the print service 330 and the printer information to the cooperative processing management service 324.

In step S1704, the print service authentication unit 810 of the cooperative processing management service 324 make a request to the print service 330 to authenticate the user. Here, the user inputs a user account (ID and password) for accessing a print service on the log-in screen displayed by the Web browser 340 instructed by the print service 330. In step S1705, if the user authentication is successful, the print service 330 returns an authentication success response and an authentication token. The returned authentication token is received by the print service authentication unit 810. Since then the authentication token is available for communicating with the print service 330. In the present embodiment, the print service printer generation unit 902 of the print service proxy 325 is used for communicating with the print service 330. Although the authentication token is not shown because it is only passed to the print service proxy 325, the cooperative processing management service 324 may manage the final authentication token by adding it to the management table shown in FIG. 12C.

In step S1706, the proxy creation unit 811 of the cooperative processing management service 324 realizes the print service proxy 325 for the user account. In step S1707, the print service proxy 325 transmits a response indicating successful creation to the proxy creation unit 811. In step S1708, the proxy creation unit 811 issues a proxy ID for identifying the created print service proxy 325. In step S1709, the proxy request transmission unit 812 transmits an authentication token, a printer registration request, and printer information for transmitting to the print service 330 to the request reception unit 901 of the print service proxy 325.

In step S1710, the print service printer generation unit 902 of the print service proxy 325 establishes connection to the print service 330 using the aforementioned authentication token. Next, the print service printer generation unit 902 transmits the printer registration request and printer information to the printer information registration unit 1001 of the print service 330. In step S1711, the printer information registration unit 1001 registers the image forming device 110, for which the registration request has been made, as a service printer, and issues an SPID for individually identifying a service printer. At this time, the printer information registration unit 1001 creates the management table shown in FIG. 12E, and associates the issued SPID with printer information and stores them in the printer information storage unit 1002.

In step S1712, the printer information registration unit 1001 transmits a response indicating successful creation and the SPID back to the print service printer generation unit 902. In step S1713, the request reception unit 901 receives the response indicating successful creation and the SPID from the print service printer generation unit 902, and passes them to the proxy request transmission unit 812.

In step S1714, the control unit 802 of the cooperative processing management service 324 stores information including a user ID, a proxy ID associated therewith, and the like as user information in the user information storage unit 803. This corresponds to the management table shown in FIG. 12C. In step S1715, the printer information storage unit 804 stores information including the SPID, the VPID associated therewith, and the like as printer information. This corresponds to the management table shown in FIG. 12D.

In step S1716, the cooperative processing request reception unit 801 of the cooperative processing management service 324 notifies the cooperative processing request transmission unit 710 of the main processing management service 321 of the fact that the registration of the printer in the print service 330 has been completed. In step S1717, the log-in reception unit 701 receives an instruction from the operation unit 702, and causes the Web browser 340 to display an indication that printer registration has been completed. The above description has been given of the second final registration processing.

Figure 20:
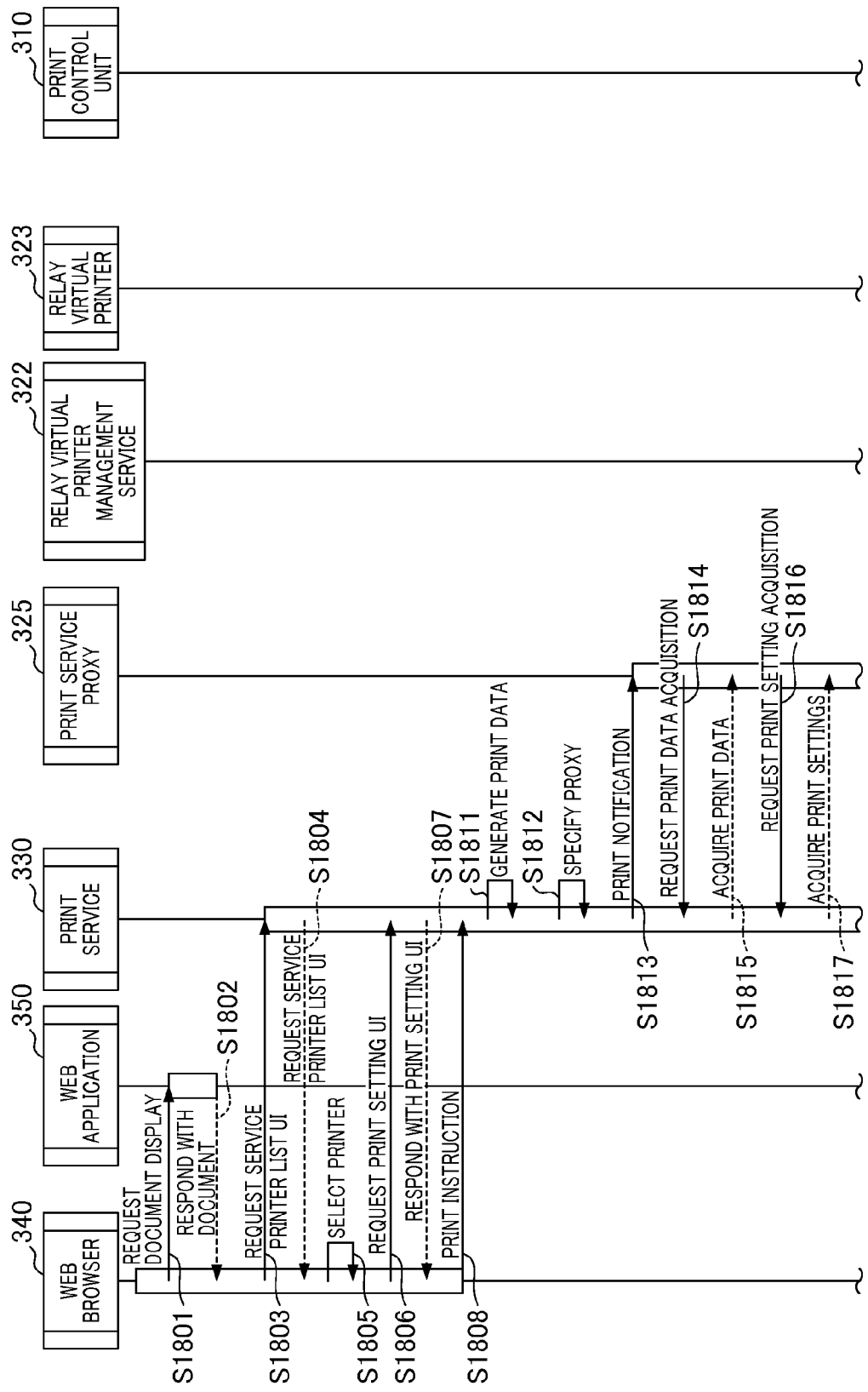
FIG. 20 is a diagram illustrating print processing for causing an image forming device to print out print data.
Figure 21:
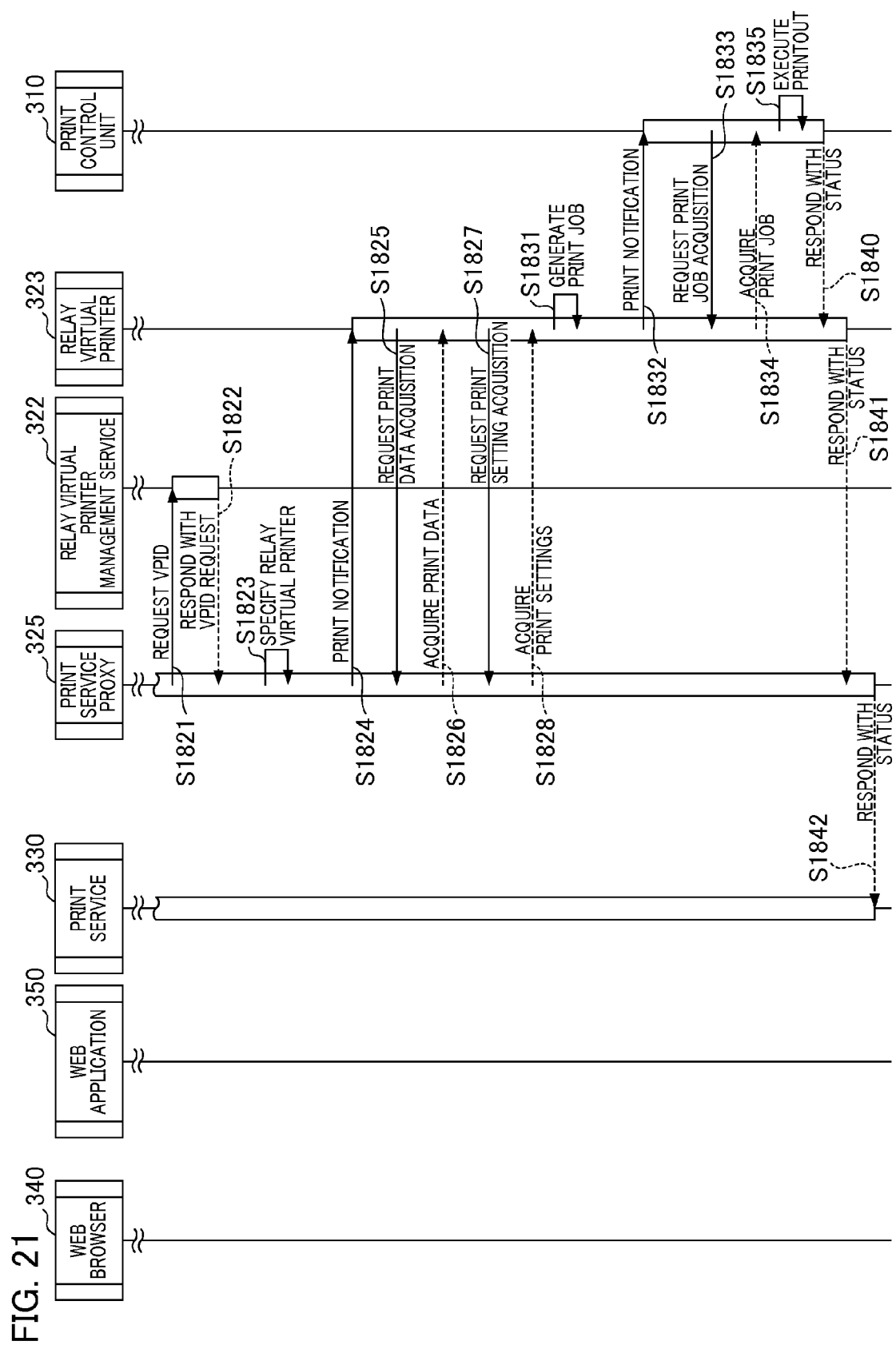
FIG. 21 is a diagram illustrating print processing for causing an image forming device to print out print data.

Next, as the third process, a description will be given of print processing for causing the image forming device 110 to print the print data generated by the print server group 130 via the print relay server 120 with reference to FIG. 20 and FIG. 21. In step S1801, the Web browser 340 requests the Web application 350 to display content which a user wishes to edit. In step S1802, the Web application 350 transmits the screen of content corresponding to the requested content to the Web browser 340. In step S1803, the Web browser 340 requests a list screen of service printers registered in the print service 330 in response to a print instruction given by a user via the content screen.

In step S1804, the printer information presentation unit 1003 of the print service 330 generates a list screen of the corresponding service printers, and transmits the list screen to the Web browser 340. The printer information presentation unit 1003 refers to the management table shown in FIG. 12E stored in the printer information storage unit 1002 and acquires a printer name list linked to the corresponding user ID to thereby be able to create a list screen. In step S1805, a user selects a service printer. In step S1806, the Web browser 340 requests a print setting screen corresponding to the service printer selected by the user. In step S1807, the printer information presentation unit 1003 transmits the print setting screen to the Web browser 340. In step S1808, the Web browser 340 transmits the print settings, which has been input by the user via the print setting screen, to the print instruction reception unit 1004 of the print service 330.

In step S1811, the print instruction reception unit 1004 passes content identification information about print data of which printing has been instructed by a user to the print data information acquisition unit 1005. The print data information acquisition unit 1005 acquires the content to be printed from the Web application 350 based on the received content identification information. Also, the print data information acquisition unit 1005 receives the print settings input from the print instruction reception unit 1004 by the user and an SPID corresponding to the printer selected by the user. The print data information acquisition unit 1005 acquires or generates print data. Also, the control unit 1006 acquires the print settings and the SPID from the print data information acquisition unit 1005. Next, the print data storage unit 1011 receives print data from the control unit 1006 and stores the print data. The print setting storage unit 1012 receives print settings from the control unit 1006 and stores the print settings. Furthermore, the control unit 1006 arranges print data in a downloadable state.

In step S1812, the control unit 1006 refers to the management table shown in FIG. 12E stored in the printer information storage unit 1002, and specifies the print service proxy 325 from the SPID and proxy ID which are associated with the designated printer name. In step S1813, the print notification transmission unit 1013 notifies the print notification reception unit 913 of the specified print service proxy 325 of the generation of print data for the service printer designated by the SPID. In step S1814, the print data acquisition unit 911 of the print service proxy 325 requests the print data storage unit 1011 of the print service 330 to acquire print data. In step S1815, the print data acquisition unit 911 acquires the print data from the print data storage unit 1011. In step S1816, the print setting acquisition unit 912 of the print service proxy 325 requests the print setting storage unit 1012 of the print service 330 to acquire the print settings. In step S1817, the print setting acquisition unit 912 acquires the print settings from the print setting storage unit 1012.

In step S1821, the printer information request transmission unit 916 of the print service proxy 325 queries the printer information request reception unit 510 of the relay virtual printer management service 322 for a VPID value corresponding to the SPID. In step S1822, the printer information request reception unit 510 refers to the management table shown in FIG. 12D stored in the printer information storage unit, acquires a VPID corresponding to the designated SPID, and transmits the VPID value back to the printer information request transmission unit 916. In step S1823, the control unit 915 specifies the process performed by the relay virtual printer 323 which is identified by the VPID acquired from the printer information request transmission unit 916.

In step S1824, the print notification transmission unit 923 notifies the print notification reception unit 603 of the relay virtual printer 323 of the fact that the print data and print settings are ready. In step S1825, the print data acquisition unit 601 of the relay virtual printer 323 requests the print data storage unit 921 of the print service proxy 325 to acquire the print data. In step S1826, the print data acquisition unit 601 acquires the print data from the print data storage unit 921. In step S1827, the print setting acquisition unit 602 of the relay virtual printer 323 requests the print setting storage unit 922 of the print service proxy 325 to acquire the print settings. In step S1828, the print setting acquisition unit 602 acquires the print settings from the print setting storage unit 922.

In step S1831, the print job generation unit 604 of the relay virtual printer 323 acquires the print data and print settings from the print data acquisition unit 601 and the print setting acquisition unit 602, respectively. The print job generation unit 604 generates a print job (PDL data or raster image) from the acquired print settings and print data. In step S1832, the print notification transmission unit 612 notifies the print notification reception unit of the corresponding print control unit 310 of the fact that a print job has been generated. Here, the corresponding image forming device 110, i.e., the actual image forming device 110 which is identifiable by an RPID associated with the relay virtual printer 323 identifiable by the VPID, can be acquired from the management table shown in FIG. 12A. As in the present embodiment, a connection relationship with the corresponding image forming device 110 may be established upon realization of the relay virtual printer 323. In step S1833, the print job acquisition unit 411 of the print control unit 310 requests the print job storage unit 611 of the relay virtual printer 323 to acquire a print job. In step S1834, the print job acquisition unit 411 acquires a print job from the print job storage unit 611. In step S1835, the print execution unit 413 instructs a print unit to output the acquired print job.

In step S1840, the print notification reception unit 412 transmits the status of the print execution result to the print notification transmission unit 612 of the relay virtual printer 323. In step S1841, the print notification transmission unit 612 transmits the status of the print execution result to the print notification transmission unit 923 of the print service proxy 325. In step S1842, the print notification transmission unit 923 transmits the status of the print execution result to the print notification transmission unit 1013 of the print service 330. The above description has been given of the third print processing.

As described above, a print service proxy having the designated SPID is notified of the print instruction provided by a user via the Web browser 340. Then, a VPID corresponding to the SPID is specified, and an RPID corresponding to the VPID is specified. Consequently, print data is printed by a printer corresponding to the RPID. In addition, since the print service proxy 325 is present for each print service 330 and for each user ID, push-printing can be performed from any print service for any user at all times.

The description has been given with respect to the first half of the first embodiment. In the following second half, a description will be given of the development function for realizing a batch setting function by developing the basic function consisting of three systems described in the first half. The basic function described in the first half consists of three groups: 1. preliminary registration, 2. final registration, and 3. print, and it is assumed that a user utilizes/operates a print system in this sequence. However, there is often a case that the assumption is not satisfied. At the start of printing, a user firstly selects a printer from an application and makes print settings depending on the capabilities of the printer. However, such print settings may not be appropriately made.

For example, if the system cannot display the setting items in a hierarchical manner or in a group, it is difficult for a user to efficiently make desired print settings from among the multi-function setting items. In addition, if prohibition processing does not work well between setting items, an inappropriate combination of print settings may be left, and thus, a printing may not be executed. Also, if only the specified setting items are displayed and any other setting items are not displayed, a user cannot make the detailed print settings. One method for eliminating these possibilities is a batch setting function. In this method, the desired print settings are registered in advance and the detailed settings are changed in a collective manner by selecting the desired print settings. The desired print settings (composite settings) are created at the print service side or the print relay server side in advance, and thus, the detailed settings and the lifting of prohibition can be realized as required.

However, since each print service performs UI construction and operation control based on printer capability information, types of possible processing depend on the specification of a print service. There is a print service which can collectively change the current print settings by selecting a batch setting, whereas there is another print service which cannot collectively change print settings and thus cannot display a batch setting screen. According to the development function of the present embodiment, the batch setting registration function to be described below executes batch setting registration depending on the capabilities of a print service by selecting an appropriate method from several registration methods. In this manner, a user can perform batch selection for any print service, in other words, a user can set detailed items.

Firstly, the summary of the batch setting function will be clarified. A user creates desired composite settings in advance via the print relay server 120 and saves it by assigning a name for it. Next, the user selects a desired setting from among the created composite settings, and registers the setting as an option of the batch setting function for the desired print service. At this time, the print relay server 120 acquires the capabilities of the print service selected by a user from the print service proxy 325 upon issuance of the SPID by the print service 330, and executes the first registration method if the print relay server 120 determines that the batch setting function is available for the print service. Also, the print relay server 120 selects the second registration method if the print relay server 120 determines that the batch setting function is unavailable for the print service but any setting items can be displayed as display objects or selects the third registration method if the print relay server 120 determines that none of these methods can be executed. Then, the print relay server 120 executes registration in accordance with each of these methods. A user can select the registered batch setting upon print execution from an application. Thereafter, the print relay server 120 generates a print job based on the print settings included in the selected batch setting, and causes the image forming device 110 to execute printing. The aforementioned description has been given with respect to the summary of the batch setting function.

Here, the following terms are defined for clarity. The term "print settings" refers to settings regarding printing. The term "print settings" may refer to a set value for each function or may refer to a collection of settings for full function to be used upon print execution. The term "composite settings" refers to an aggregation of a plurality of print settings, and, in the present embodiment, particularly refers to a print setting group previously created by a user prior to registration in a print service. The term "batch setting" refers to an aggregation of a plurality of print settings, and, in the present embodiment, particularly refers to a setting selectable by a user on a print service UI screen. The term "batch setting" refers to the setting in which the previously created "composite settings" are registered in a print service. Also, the term "batch setting function" refers to the function that makes each "batch setting" selectable and executes printing using the print settings linked to the selected batch setting.

Figure 22:
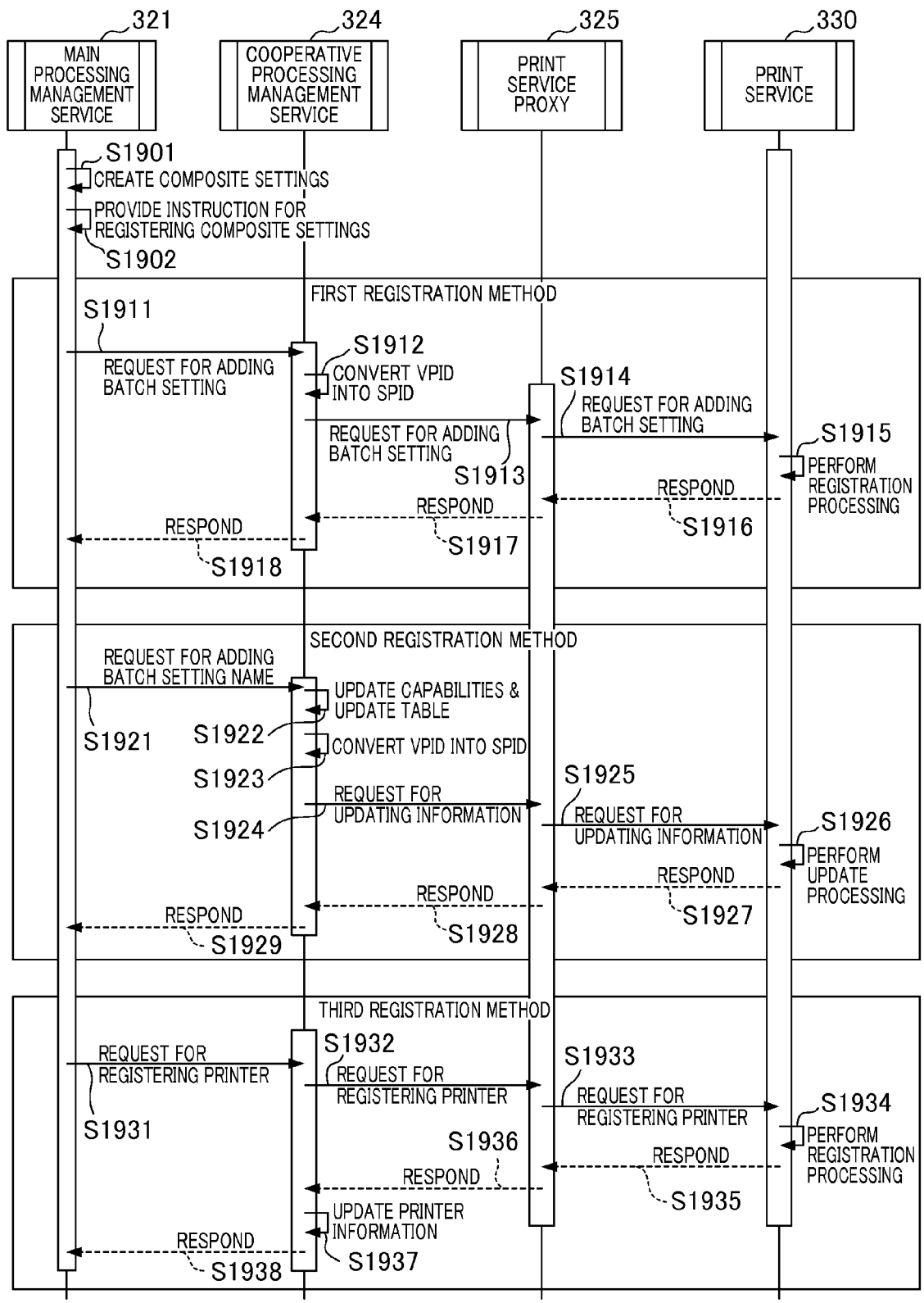
FIG. 22 is a diagram illustrating batch setting registration processing for registering composite settings in a print service.

A description will be given of a batch setting registration method with reference to the sequence diagram shown in FIG. 22. In step S1901, a user creates composite settings in advance. This is performed by a user via the print relay server 120 in preparation for the user to register a batch setting in a print service. In other words, a user creates desired composite settings in advance and saves it in the print relay server 120 by assigning a name for it.

The operation unit 702 of the main processing management service 321 displays the UI setting screen shown in FIG. 16A on the Web browser 340 by the press on the addition/deletion button 1117 for the composite settings shown in FIG. 11B. Here, if there are any composite settings 1401 that have already been created, these composite settings 1401 are listed on the Web browser 340. A user can delete composite settings by pressing down a deletion button 1402. Each setting item 1403 receives any settings made by a user. When a user presses down a registration button 1405, the user information storage unit 703 saves the print settings together with the name input on a name 1404 in accordance with the instruction given by the operation unit 702.

For example, in the settings shown in FIG. 16A, it is assumed that duplex printing and monochrome setting are made while other settings remain unchanged as initial values (A4 size, normal layout, and no stapling) and the item "Duplex+Mono" is assigned for the settings. In this case, the name is stored as a ProfileName 1214 and the print settings as shown in FIG. 14B1 are stored as a ProfilePT 1215 in the management table as shown in FIG. 13B1. In another example, it is assumed a case where a user selects "booklet" for layout and "saddle stitch (saddle)" for stapling by changing them from the initial values and the item "Booklet+Saddle" is assigned for the settings. In this case, the operation unit 702 creates the ProfilePT shown in FIG. 14B2, and stores the created ProfilePT in the user information storage unit 703 as shown in FIG. 13B1. When a user presses down an OK button 1406, print setting processing ends and the screen returns to the previous screen.

Next, in step S1902, the log-in reception unit 701 of the main processing management service 321 functions as a reception unit that receives a log-in for registering the composite settings created by a user in a print service. When a user presses down the cooperation button 1115 displayed as "use print service" shown in FIG. 11B, the UI exemplified in FIG. 16B is displayed. A user selects a printer 1411 of interest, selects desired composite settings 1412, and presses down a registration button 1413. The log-in reception unit 701 receives a request for realizing a batch setting, which can set a plurality of print settings in a collective manner, by means of the print service 330 as a result of a press-down of the button 1413. Then, the following registration flow starts.

Firstly, it is determined which registration method is to be applied depending on the print service to be registered. A description will be given of the determination with reference to the flowchart shown in FIG. 17A. In step S1501, the print relay server 120 determines whether or not the batch setting function is available for the print service 330. If the batch setting function is available, the batch setting function is registered using the "first registration method" in step S1502. A method for determining whether or not the batch setting function is available will be described below. The details of the "first registration method" will also be described below.

In step S1501, if the print relay server 120 determines that the batch setting function is unavailable for the print service 330 (i.e., No in step S1501), the print relay server 120 determines in step S1503 whether or not all the print items included in the composite settings can be displayed by the print service 330. If the print relay server 120 determines that all the print items can be displayed, all the print items are registered using the "second registration method" in step S1504. A method for determining whether or not all the print items included in the composite settings can be displayed by a print service will be described below. Also, the details of the "second registration method" will be described below. If the print relay server 120 determines in step S1503 that a composite screen desired by a user cannot be displayed, the registration is performed using the "third registration method" in step S1505. The details of the "third registration method" will be described below. Note that the processes in steps S1501 and S1503 may refer to capability information as appropriate by creating and storing the capability information for each print service in advance but may also be determined by acquiring information from the print service 330 of interest upon registration of the batch setting.

A description will be given of a method for determining by the print relay server 120 whether or not the batch setting function is available for the print service 330. The expression "the batch setting function is available" means that, when a user selects any batch setting from the UI provided by a print service, the print settings linked to the batch setting can be reflected on the current print settings. In other words, the expression "the batch setting function is available" means that the print service 330 can reflect the print settings associated with the batch setting selected upon print instruction given by a user on a print job. In order to realize this, the print service 330 itself needs to support the batch setting function. An example of such realization is that the print service 330 can register the batch setting associated with the batch setting name included in batch setting printer information. Also, it is necessary that the Java (registered trademark) script for reflecting the composite settings is operable, the print service 330 executes inquiry to a vendor, or the print service 330 supports the operation or function that conforms to these processes.

In the present embodiment, the operation unit 702 of the main processing management service 321 refers to the user information storage unit 703, and acquires support information about the service capabilities of the print service 330. Then, the operation unit 702 determines the operation of the service capabilities of the print service 330, and transmits the determination result to the print service 330 via the print service proxy 325. In other words, the operation unit 702 functions as a determination unit that determines whether or not the batch setting function is available for the print service 330 based on the acquired support information. If all the items are available for the printer information presentation unit 1003, the determination in step S1501 is "YES".

A description will be given of the flow in which the print service itself supports the batch setting function, and thus, the batch setting function becomes available by registering composite settings in a print service if the determination in step S1501 is "YES" as a typical example. However, it is needless to say that it can also be realized by the implementation of Java (registered trademark) script or the like.

A description will be given of the registration procedure by the "first registration method" with reference to the sequence diagram shown in FIG. 22 (steps S1911 to S1918). In step S1911, the cooperative processing request transmission unit 710 of the main processing management service 321 transmits a request for adding the batch setting to the print service 330 and batch setting information to the cooperative processing request reception unit 801 of the cooperative processing management service 324. Here, among the management table shown in FIG. 13B1, the VPID 1212 of the target printer, the ProfileName 1214, and the ProfilePT 1215 of the composite settings to be registered are necessary information.

In step S1912, the control unit 802 of the cooperative processing management service 324 refers to the management table shown in FIG. 12D stored in the printer information storage unit 804, and acquires an SPID associated with the received VPID. In step S1913, the control unit 802 transmits the request for adding the batch setting to the print service 330 and batch setting information to the request reception unit 901 of the print service proxy 325 via the proxy request transmission unit 812. Here the request reception unit 901 receives an SPID, a ProfileName, and a ProfilePT.

In step S1914, the print service printer generation unit 902 firstly specifies a target printer from the SPID, and transmits a request for adding a batch setting and batch setting information to the printer information registration unit 1001 of the print service 330. Here, the printer information registration unit 1001 receives the ProfileName and the ProfilePT. In step S1915, the printer information registration unit 1001 updates the management table from the one shown in FIG. 12E to the one shown in FIG. 13E1 upon receiving the batch setting. In other words, the printer information registration unit 1001 adds a ProfileName 1247 and a ProfilePT 1248 to the printer information storage unit 1002 with respect to the printer designated by the SPID 1242. When registration has been completed, each processing unit returns a response indicating that additional registration is successful to the processing unit that has made a request for adding the batch setting in steps S1916, S1917, and S1918. The aforementioned description has been given of the registration procedure by the "first registration method".

Next, a description will be given of the registration procedure by the "second registration method" with reference to the sequence diagram shown in FIG. 22 (steps S1921 to S1929). A description will be given of the method for determining whether or not all the print items included in the composite settings can be displayed by the print service 330. The print service 330 constructs a UI based on the capabilities provided by the print relay server 120. However, the printer information presentation unit 1003 of the print service 330 does not necessarily display all the items described in the capabilities on the UI. The printer information presentation unit 1003 may display generally-defined public items only or may display the display items restricted by unique criteria. In this case, even if the print relay server 120 describes unique functions as items, all the items may not be displayed on the UI provided by the printer information presentation unit 1003. On the other hand, there is also another print service that displays all the items described in the capabilities on a UI. The operation unit 702 determines the operation of the service capabilities of the print service 330, and transmits the determination result to the print service 330 via the print service proxy 325. In other words, if the printer information presentation unit 1003 cannot register the batch setting associated with the batch setting name but displays all the items, the determination in step S1501 is "YES".

In step S1921, the cooperative processing request transmission unit 710 of the main processing management service 321 transmits a request for adding the batch setting name to the capabilities and its relevant information to the cooperative processing request reception unit 801 of the cooperative processing management service 324. Here, among the management table shown in FIG. 13B1, the cooperative processing request transmission unit 710 sends the VPID 1212 of the target printer and the ProfileName 1214 of the composite settings to be registered.

In step S1922, the cooperative processing request reception unit 801 passes the received ProfileName to the control unit 802, and the control unit 802 adds the Profile item to the capabilities of the printer information storage unit 804. FIG. 14A1 shows the state in which the Profile is added to the capabilities. The added Profile item is also ProfileName. In association with this, the Profile item is also added to a specified value for print settings, which is shown by the reference numeral 1391 in FIG. 14B3. Note that the term "Default" means an initial value. The control unit 802 reflects these specified values of capabilities and print settings on the management table shown in FIG. 12D, and updates the capabilities 1234 and the print setting specified value 1235 for the printer designated by the VPID. In step S1923, the cooperative processing management service 324 refers to the table shown in FIG. 12D, and acquires an SPID associated with the received VPID.

In step S1924, the proxy request transmission unit 812 transmits a request for updating the capabilities to be made to the print service 330 and its relevant information to the request reception unit 901 of the print service proxy 325. Here, the request reception unit 901 receives an SPID, capabilities, and a print setting specified value.

In step S1925, the print service printer generation unit 902 specifies the target printer from the received SPID, and transmits the information updating request, the capabilities, and the print setting specified value to the printer information registration unit 1001 of the print service 330. In step S1926, the printer information registration unit 1001 receives the capabilities of which updating has been requested, and updates the management table shown in FIG. 12E. Here, the printer information registration unit 1001 updates the capabilities 1245 and the print setting specified value 1246 with respect to the printer designated by the SPID 1242 managed by the management table of the printer information storage unit 1002. When the update has been completed, a response indicating successful update is returned in steps S1927, S1928, and S1929. The foregoing description has been given of the registration procedure by the "second registration method".

Next, a description will be given of the registration procedure by the "third registration method" with reference to the sequence diagram shown in FIG. 22 (steps S1931 to S1939). In step S1931, the cooperative processing request transmission unit 710 of the main processing management service 321 transmits a request for registering a printer in the print service 330 and printer information (second printer information) to the cooperative processing request reception unit 801 of the cooperative processing management service 324. Here, among the management table shown in FIG. 13B1, the cooperative processing request transmission unit 710 sends the VPID 1212 of the target printer, the ProfileName 1214 and the ProfilePT 1215 of the composite settings to be registered, and the capabilities 1204 shown in FIG. 12A.

In step S1932, the proxy request transmission unit 812 transmits the request for registering a printer in the print service 330 and printer information to the request reception unit 901 of the print service proxy 325. In step S1933, the print service printer generation unit 902 transmits a request for registering a printer and batch setting printer information corresponding to the setting content of batch setting to the printer information registration unit 1001 of the print service 330. A combined printer name of for example, the original printer name and the ProfileName is used. In the present embodiment, the combined printer name is "Printer 1<Duplex+Mono>".

In step S1934, the printer information registration unit 1001 registers a printer for which registration has been requested as a service printer, and stores the registered printer in the printer information storage unit 1002. The printer information registration unit 1001 issues an SPID (second printer identification information) for independently identifying a service printer after the registration processing. At this time, the printer information storage unit 1002 updates the management table from the one shown in FIG. 12E to the one shown in FIG. 13E2. As shown in FIG. 13E2, it can be seen that a printer having the SPID 1242, the printer name 1243, and the print setting specified value 1246 that are different from those of the original printer has been added. Note that the original SPID will be described below.

In steps S1935, the printer information registration unit 1001 transmits a response indicating successful creation back to the print service printer generation unit 902. In step S1936, the request reception unit 901 transmits the SPID newly issued by the printer information registration unit 1001 back to the proxy request transmission unit 812. In step S1937, the printer information storage unit 804 of the cooperative processing management service 324 stores information including the SPID, the VPID associated therewith, and the like as printer information. This corresponds to the management table shown in FIG. 13D1.

In step S1938, the cooperative processing management service 324 notifies the main processing management service 321 of the fact that printer registration has been completed. In this manner, even if the print service 330 cannot be used for the batch setting function and the printer information presentation unit 1003 does not display all the items described in the capabilities, the batch setting function can be provided to a user. The printer information presentation unit 1003 displays a printer name including the content of the batch setting, and thus, a user can understand the setting content to thereby select a batch setting. Since the composite settings corresponding to the batch setting are registered as the specified values for the print settings of a printer, the batch setting can be reflected on a print service with a normal print system without introducing a complicated mechanism. In other words, the printer information presentation unit 1003 functions as a generation unit that generates a printer selection screen corresponding to the print setting content, and a user can select a printer correspond to both of the print settings and the batch setting. The foregoing description has been given of the registration procedure by the "third registration method".

Although the aforementioned registration is made by the print relay server 120, such registration may also be made on a printer panel. It is also assumed that there is a system in which the functions corresponding to the main processing management service 321, the cooperative processing management service 324, and the print service proxy 325 of the print relay server 120 are installed on the main system side. In this case, the image forming device 110 alone can adopt a system without intervention of the print relay server 120. In other words, the print relay server 120 or the image forming device 110 functions as a processing device that executes registration processing.

Figure 23:
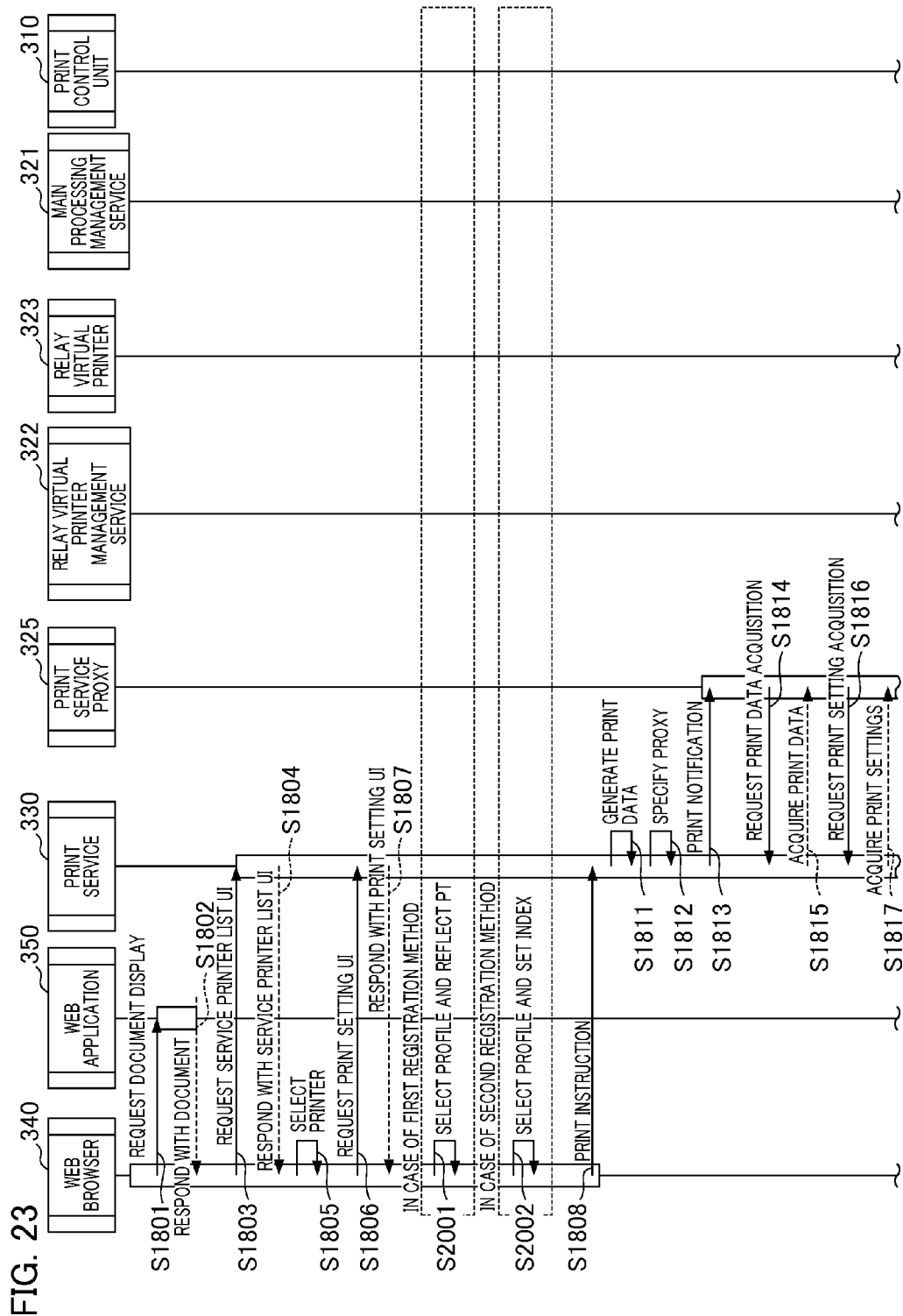
FIG. 23 is a diagram illustrating print processing for causing an image forming device to print out print data.
Figure 24:
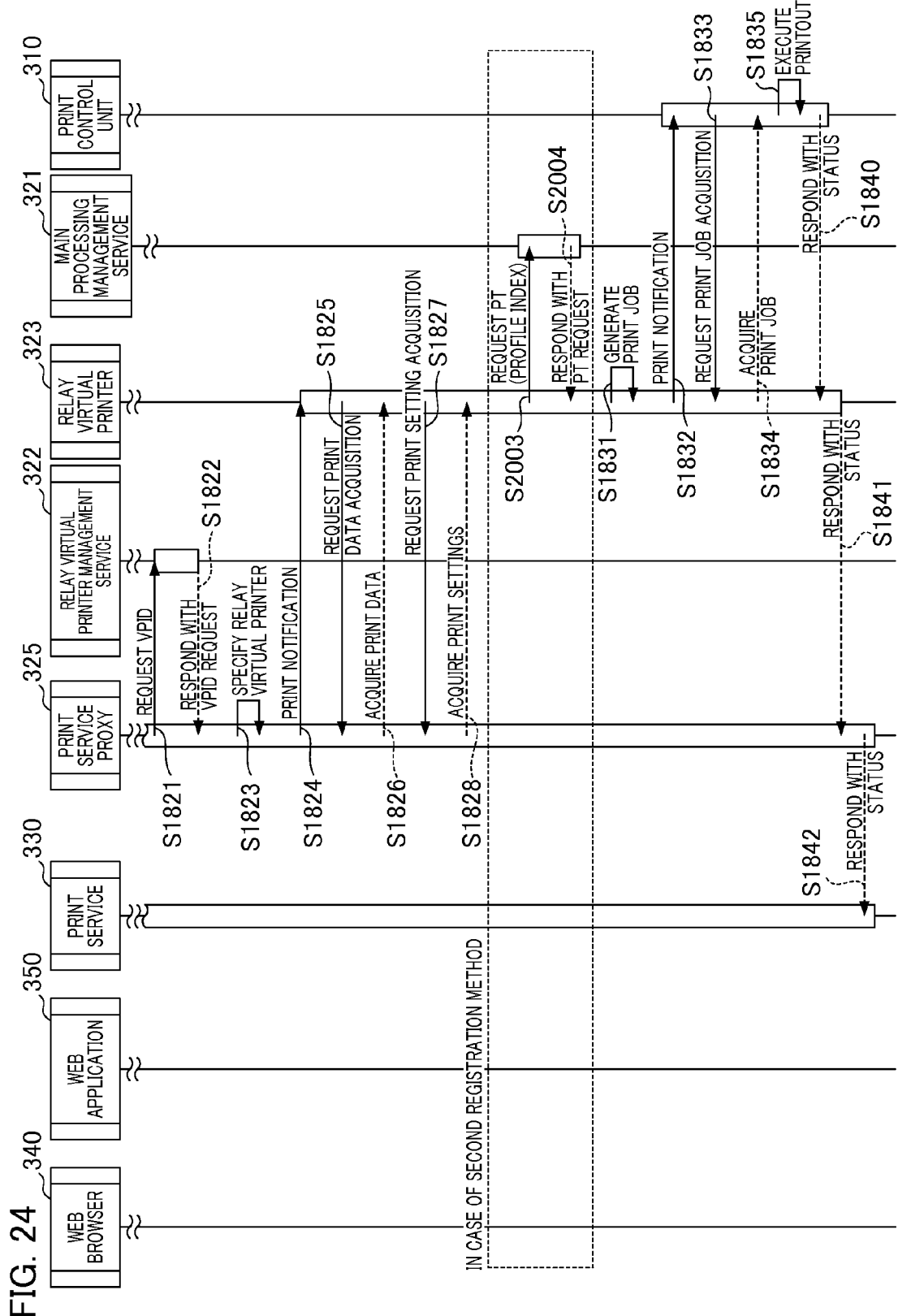
FIG. 24 is a diagram illustrating print processing for causing an image forming device to print out print data.

From here, a description will be given of the printing method performed when the batch setting is selected with reference to the sequence diagrams shown in FIG. 23 and FIG. 24. Note that the same reference numerals are used for the same processes provided by the basic function shown in FIG. 20 and FIG. 21. Firstly, a description will be given of a print procedure performed by the "first registration method". The processes in steps S1801 to S1807 are the same as those provided by the basic function.

In the case of the first registration method, the printer information presentation unit 1003 of the print service 330 displays a UI exemplified in FIG. 16C1 in step S1807. More specifically, the printer information presentation unit 1003 displays a printer name search function 1421, a printer name 1422, a detailed setting display switching button 1423, and a batch setting 1424 on the UI shown in FIG. 16C1. The item "Default" indicating a specified value and the name stored in the ProfileName 1247 shown in FIG. 13E1 are listed on the batch setting 1424. In the present embodiment, three items: "Default", "Duplex+Mono", and "Booklet+Saddle" are listed on the batch setting 1424.

When a user selects any option from the batch setting 1424, the control unit 1006 of the print service 330 refers to the table shown in FIG. 13E1 stored in the printer information storage unit 1002 in step S2001. The control unit 1006 acquires the ProfilePT 1248 corresponding to the ProfileName selected by the user, and reflects the ProfilePT 1248 on the current print settings. In the present embodiment, since a user selects the item "Duplex+Mono", the print settings are made as shown in FIG. 14C. The print setting screen is also updated so as to reflect the current settings. When a user further changes the detailed settings from this state, such changes may also be accepted. Next, print processing starts using the determined print settings and the flow of processes is the same as that provided by the basic function from step S1808 to step S1842. The above description has been given of the print procedure by the "first registration method".

Next, a description will be given of the print procedure by the "second registration method". The processes in steps S1801 to S1807 are the same as those provided by the basic function. In the case of the second registration method, the printer information presentation unit 1003 displays a UI exemplified in FIG. 16C1 in step S1807. Items included in the capabilities 1245 shown in FIG. 12E, i.e., items 1381 shown in FIG. 14A1 are listed on the batch setting 1424. In the present embodiment, three items: "Default", "Duplex+Mono", and "Booklet+Saddle" are listed on the batch setting 1424. When a user selects any option from the batch setting 1424, the selected ProfileName is stored in the current print settings in step S2002. In the present embodiment, since a user selects the item "Duplex+Mono", the print settings are made as shown in FIG. 14C1.

Next, although print processing starts using the determined print settings, the flow of processes is the same as that provided by the basic function from step S1808 to S1828. In the second registration method, processing for reflecting the described batch setting on print settings needs to be performed prior to the generation of a print job using the print settings.

In step S2003, the print job generation unit 604 of the relay virtual printer 323 instructs the print setting acquisition unit 602 to make a request for the print settings corresponding to the ProfileName of the batch setting to the main processing management service 321. In step S2004, the operation unit 702 of the main processing management service 321 refers to the management table shown in FIG. 13B1 stored in the user information storage unit 703. Then, the operation unit 702 specifies the ProfilePT 1215 corresponding to the received ProfileName 1214, and transmits the ProfilePT 1215 back to the print setting acquisition unit 602 via the printer information request transmission unit 704. In the present embodiment, the ProfilePT is obtained as the sprint settings, i.e., the settings as shown in FIG. 14B1. Although the print job generation unit 604 generates a print job using the acquired print settings, the flow of printing processes is the same as that provided by the basic function from steps S1831 to S1842.

In step S1831, the relay virtual printer 323 holds the basic settings and the batch setting items shown in FIG. 14C1 as the print settings. In the present embodiment, the print job generation unit 604 prioritizes the composite settings obtained in step S2004. However, the print job generation unit 604 may also have a mode for activating the basic settings. In other words, the function of providing a UI switch for giving priority to the batch setting, for giving priority to the basic settings, or for using the basic settings only in the case of "Default" may also be introduced. The above description has been given of the print procedure by the "second registration method".

Next, a description will be given of the print procedure by the "third registration method". In the method, a new printer is added, and thus, the entire flow, i.e., the flow of processes in steps S1801 to step S1842 is the same as that provided by the basic function. In the case of the third registration method, the printer information presentation unit 1003 displays a UI exemplified in FIG. 16C2 in step S1807 unlike the first registration method and the second registration method. The difference between FIG. 16C2 and FIG. 16C1 lies in the fact that the printers 1432 in which the specified values for the print settings has been changed are listed instead of providing the batch setting 1424. Unless otherwise specified, the UI function is equivalent to that shown in FIG. 16C1.

A printer 1431 is an original printer linked to standard print settings. When a user selects a batch setting printer 1432, the print instruction reception unit 1004 of the print service 330 passes the SPID of the printer 1432 to the control unit 1006. The control unit 1006 refers to the management table shown in FIG. 13E2 based on the received SPID, acquires the print setting specified value 1246 corresponding to the selected printer name 1243, and reflects the print setting specified value 1246 on the current print settings. In the present embodiment, since a user selects the item "Printer 1<Duplex+ Mono>", the print settings are made as shown in FIG. 14C. The print settings are used for the processes subsequent to step S1808. The above description has been given of the print procedure by the "third registration method".

As described above, these registration methods are used properly depending on the capabilities of a print service so that the batch setting function is available for any print service. In other words, the composite settings created by an image forming device or a print relay server in advance can be designated as the batch setting function by a user on a print service so that the detailed settings provided by a vendor becomes available. The batch setting function is registered using a registration unit depending on the display capability and the UI processing capability of a print service so that the batch setting function can be realized for various assumed types of a print service. Consequently, the detailed consistent print settings that have been previously prepared by the vendor side become available for any print service.

Even when the specification of a print service has changed or another print service is used, the user information storage unit 703 holds the management table shown in FIG. 13B1, and thus, the created composite settings can be used without wasting thereof. The ProfileName 1214 and the ProfilePT 1215 shown in FIG. 13B1 may also be available for different users and different printers, whereby the created composite settings are promoted to be reused. In other words, even when a plurality of print services is in cooperation with each other or the specification of a specified print service changes, the previously-created composite settings can be used without changing the implementation of an image forming device or its virtual device.

Second Embodiment

In the first embodiment, the first registration method performed in step S1502 is applied when the batch setting function is available for a print service (YES in step S1501). Then, the batch setting is selected in step S2001, and thus, the print settings in the batch setting with consistency are reflected on the current print settings. However, a user can further change individual detailed setting(s) of the print settings on which the batch setting has been reflected. At this time, as a result of changing certain print setting item(s) by a user, prohibition processing for the batch setting during UI processing by a print service may not be executed and thus the batch setting may not be consistent. If prohibition processing is not performed, inconsistent print settings may be made.

Figure 17A:
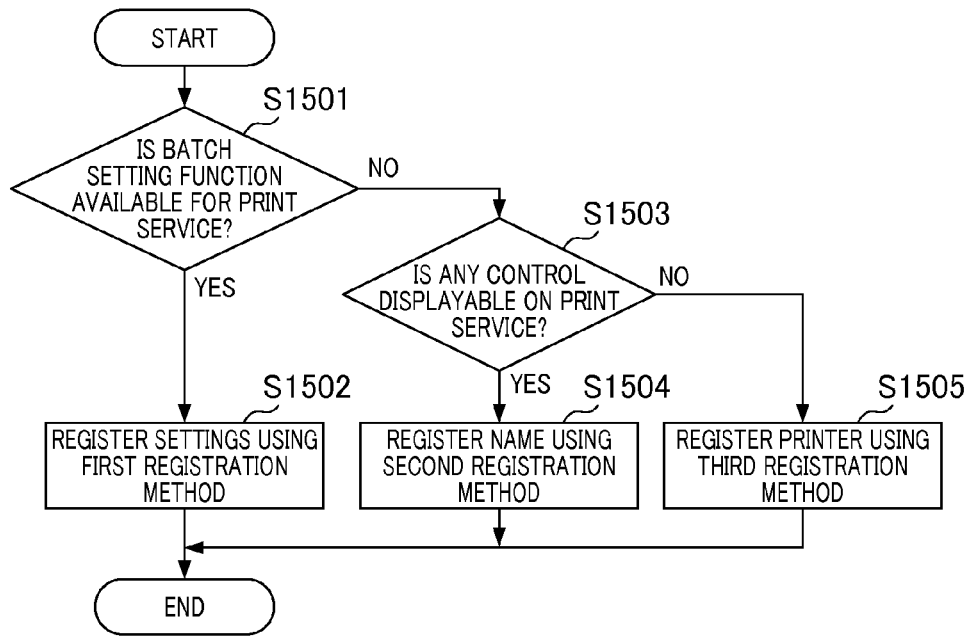
FIG. 17A is a diagram illustrating the flow of batch setting registration according to a first embodiment.

Thus, in the present embodiment, a description will be given of a method for applying another registration method, when prohibition processing is not performed during UI processing for a print service, with reference to FIG. 17A. Not only items but also the prohibition relationship (not shown) between items can be described in the capabilities shown in FIG. 14A, and the print service 330 can perform prohibition processing based on the information. Note that whether or not prohibition processing is performed depends on the print service 330.

Hence, prior to step S1501, the operation unit 702 of the main processing management service 321 determines whether or not the print service 330 of interest performs prohibition processing based on support information. If the operation unit 702 determined the result to be NO, the operation unit 702 applies the third registration method in step S1505. In step S1501, the operation unit 702 may not only determine whether or not the print service of interest has the batch setting function but also determine whether or not prohibition processing is performed. In this case, the operation unit 702 applies the second registration method or the third registration method based on support information.

As described above, when the print service 330 does not have the prohibition processing capability for UI, the operation unit 702 selects the third registration method. In this manner, even if the print service 330 does not have the prohibition processing capability, the print settings including any prohibition item(s) are not displayed by the Web browser 340. Consequently, print processing can be realized without any inconsistency.

Third Embodiment

In the first embodiment, a description has been given of an example in which the print relay server 120 realizes the batch setting in any case and thus a user makes changes in detailed settings. However, in the case of office use, an administrator may wish to set authority for each user so as to prevent users from freely changing the settings. Accordingly, a description will be given of a method for suppressing any change in the detailed settings after the batch setting by including the capabilities of which the function is restricted in composite settings, which corresponds to the foregoing case. The method is a development of the third registration method. In the present embodiment, it is assumed a case where the administrator creates composite settings.

Firstly, a description will be given of creation of composite settings. At the time of creation of composite settings or in advance the administrator restricts an authority for each user in advance, i.e., the batch setting selectable for each user and registers restriction information in the main processing management service 321. Although the operation unit 702 creates the print settings shown in FIG. 14B1 using the UI shown in FIG. 16A in the first embodiment, the operation unit 702 creates the print settings shown in FIG. 14B1 and the capabilities shown in FIG. 14A2 at the same time in the third embodiment. The operation unit 702 describes only the same items as the composite settings as printer function information in the capabilities shown in FIG. 14A2. By registering the restricted capabilities as a function restriction instruction in the print service 330, other options are not listed on the UI generated by the print service 330 based on the capabilities, and thus, the setting change cannot be made. Note that any changeable item such as PaperSize may also be left. FIG. 13B2 is the same management table as that shown in FIG. 13B1 except that a ProfilePC 1216 is added as the capabilities.

Figure 17B:
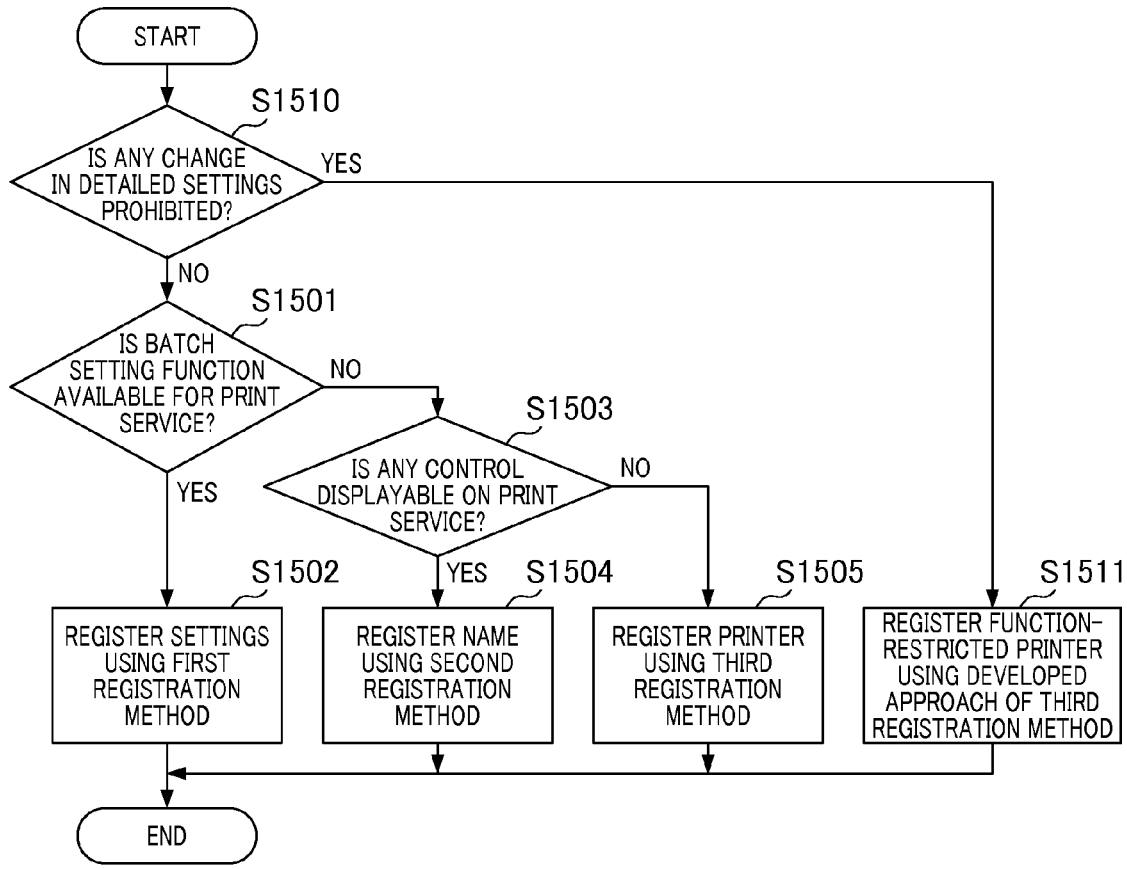
FIG. 17B is a diagram illustrating the flow of batch setting registration according to a second embodiment.
Figure 18:
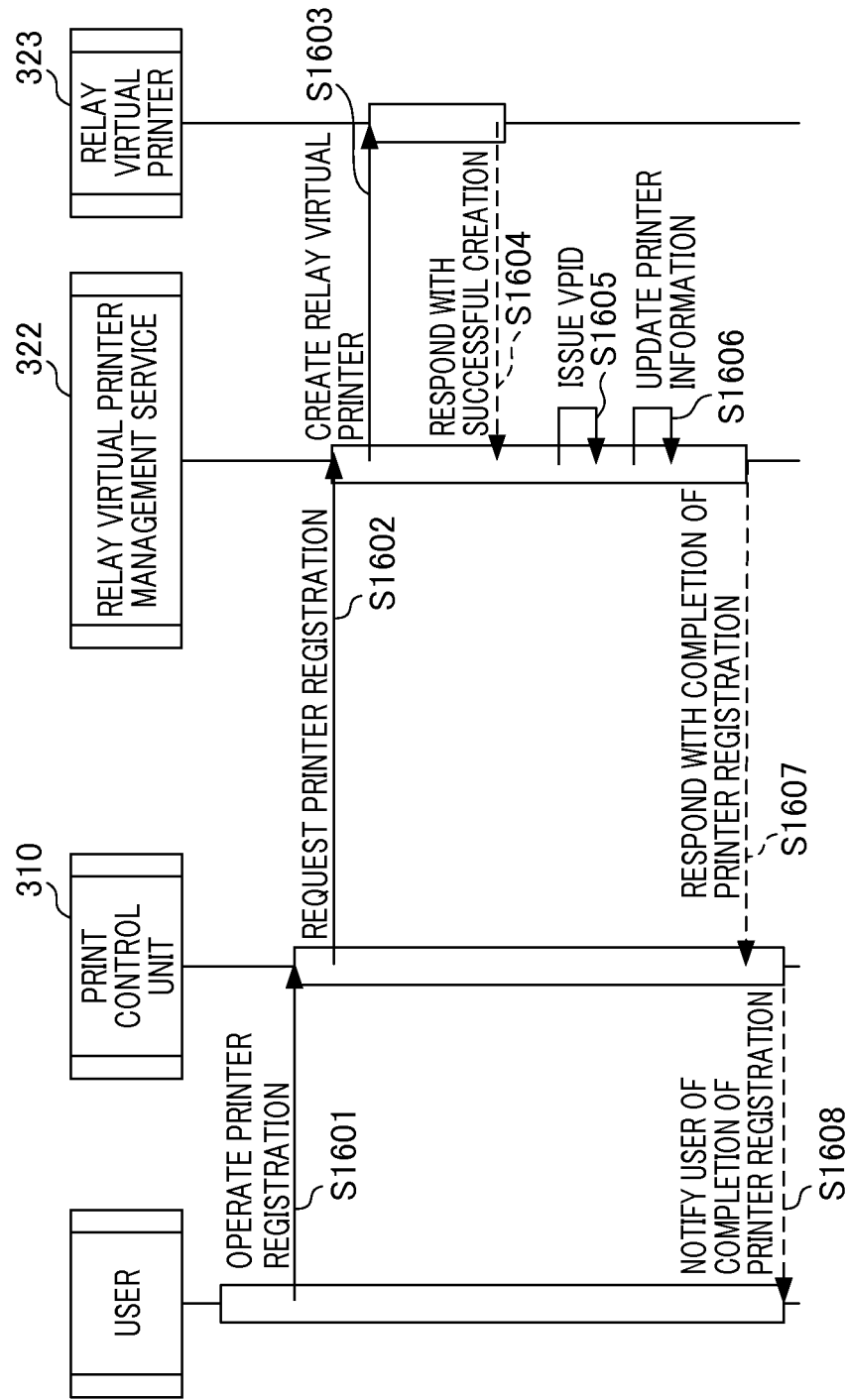
FIG. 18 is a diagram illustrating preliminary registration processing for registering an image forming device in a print relay server.

A detailed description will be given of registration of composite settings. Note that the same reference numerals are used for the same processes as those shown in FIG. 17A. Firstly, as shown in FIG. 17B, the operation unit 702 of the main processing management service 321 performs condition determination for determining which one of the registration methods is used. In step S1510, the operation unit 702 refers to the management table shown in FIG. 13B2, and determines whether or not the administrator prohibits any change in the detailed settings by a user. In the present embodiment, the ProfilePC 1216 is present, and thus, the operation unit 702 determines that the answer is YES in step S1510. In step S1511, the operation unit 702 registers a function-restricted printer using the developed approach of the third registration method. If the operation unit 702 determines that the answer is NO in step S1510, the same processes as those in the first embodiment are subsequently performed.

In step S1511, the print settings and the capabilities are registered in a print service. In other words, from steps S1931 to S1933 shown in FIG. 22, the cooperative processing request transmission unit 710 of the print relay server 120, the proxy request transmission unit 812, and the print service printer generation unit 902 execute the following processing. The cooperative processing request transmission unit 710, the proxy request transmission unit 812, and the print service printer generation unit 902 also transmit the capabilities of the ProfilePC 1216 shown in FIG. 13B2. In step S1934, the printer information storage unit 1002 of the print service 330 creates the management table shown in FIG. 13E3. As compared with the capabilities shown in FIG. 13E2, it can be seen that the capabilities shown in FIG. 13E3 save different settings from those in the capabilities of the original printer. As described above, the printer information storage unit 1002 of the print service 330 registers the restricted capabilities.

Next, a description will be given of printing using the batch setting. The printer information storage unit 1002 of the print service 330 displays the UI shown in FIG. 16C2 upon request of the print setting UI. This is the same as the third registration method of the first embodiment. In the first embodiment, a user can change the detailed settings by displaying them by means of the detailed setting display switching button 1423. However, in the present embodiment, the printer function is restricted and other options are not included, whereby the detailed settings cannot be changed. A user selects any one of printers shown in FIG. 16C2 and executes printing. The flow of processing upon print execution is the same as that of the first embodiment.

Note that the restricted capabilities may also be linked to the original printer having a specified setting value. The flow of registering only a printer(s) having specified print settings may also be used without registering an original printer. As described above, even when the administrator wishes to restrict print settings depending on an authority for each user, it can be realized by creating the function-restricted capabilities in advance and registering them in a print service.

Fourth Embodiment

In the first embodiment, a description has been given of the flow in which the composite settings are created by the main processing management service 321 in advance and then registered in the print service 330. However, there is often a case where a user wishes to register the composite settings upon print execution, resulting in less convenience for a user in the aforementioned embodiments. Accordingly, in the fourth embodiment, a description will be given of a method that enables registration upon print execution.

Although the printer information presentation unit 1003 of the print service 330 displays the UI screen shown in FIG. 16C1 or FIG. 16C2 upon print execution, the current print settings are saved as the batch setting depending on the approach of each registration method if the icon "save the settings" is turned ON. In the case of the first registration method, after print execution, the print instruction reception unit 1004 receives the composite settings, and the control unit 1006 adds the composite settings to the management table of the printer information storage unit 1002 shown in FIG. 13E1. The printer information storage unit 1002 saves the print settings upon print execution in the ProfilePT 1248. Also, the printer information storage unit 1002 saves a name created by a user input (not shown) or automatic naming in the ProfileName 1247. Thereafter, a user can use the batch setting upon print execution. In the automatic naming, serial numbers may be used or the feature extracted from the print settings may also be reflected.

In the case of the second registration method, the "save the settings=ON" is saved in the current print settings, and then, the printing starts. Instead of acquiring the composite settings upon print execution at the timing in step S2003 shown in FIG. 24, the print settings made upon print execution are registered as the composite settings. As shown in FIG. 13B1, the operation unit 702 of the main processing management service 321 adds the print settings to the ProfilePT 1215 for storage. Also, the operation unit 702 saves the name created by a user input or automatic naming in the ProfileName 1214. Then, the composite settings are registered in a print service in accordance with the registration procedure of the second registration method. Thereafter, a user can use registration procedure upon print execution.

In the case of the third registration method, the control unit 1006 of the print service 330 adds a printer as new one to the printer information storage unit 1002 as shown in FIG. 13E2. The printer information storage unit 1002 saves the print settings made upon print execution in the print setting specified value 1246. Also, the printer information storage unit 1002 saves the name created by a user input or automatic naming in the printer name 1243. The SPID 1242 is issued by the printer information registration unit 1001 upon printer creation. For other settings including capabilities or the like, the same items as those for the original printer are used. At this time, an SPID 1249 indicating the original printer is also saved. Thereafter, a user can use the printer upon print execution. It should be noted that, when the original SPID 1249 is present, the print service 330 uses the original SPID 1249 instead of the SPID 1242 upon print execution. This is because the print relay server 120 for receiving an SPID is unaware of the newly issued SPID and the output printer can be specified by the original SPID.

In the case of the third registration method, an additional operation may also be performed on a printer management screen (not shown) provided by the print service 330 instead of during print execution. In this case, a user selects a printer from a printer list, and copies the printer and changes its print settings to thereby realize the third registration method. Other internal processing is the same as that performed upon print execution, and the print service 330 adds a printer and saves its print settings to/in the management table shown in FIG. 13E2.

In the additional registration performed by the first registration method and the third registration method upon print execution, the print relay server 120 recognizes the current settings and passes the settings to the printer information storage unit 804 of the cooperative processing management service 324 as in the second registration method. The printer information storage unit 804 updates the stored management table, and then may use an approach for registering the updated settings on the print service 330 via the print service proxy 325. As described above, even if the composite settings are not prepared in advance, the batch setting can be additionally registered during the flow of a series of print execution.

Fifth Embodiment

In the aforementioned embodiment, a user assigns the name 1404 to the composite settings shown in FIG. 16A upon creation of the composite settings. However, it is troublesome for a user to input a name to the name 1404 every time. Accordingly, in the present embodiment, a description will be given of a method that enables automatic naming. Here, the operation unit 702 of the main processing management service 321 functions as a changing unit that automatically gives a name to the name of the batch setting based on the feature extracted from the print settings. For example, when duplex printing and monochrome printing are set based on the change of specified values, the operation unit 702 gives a name "Duplex+Mono" to the name 1404. Many changes of functions leads a long name, thereby reducing the visibility or cutting off the name from the display which hides a part of its name from view. Thus, a short name corresponding to the function may be set in advance. For example, the operation unit 702 sets a short name such as "dup" in the case of duplex printing. Note that the automatic naming may be saved as a temporary name so as to allow a user to edit it.

These set names can be used as a rule set so that a user can search by name. For example, when a printer registered by the third registration method is selected on the UI screen shown in FIG. 16C2, a user can readily narrow down a printer having the print settings by inputting a set name (e.g., "dup") to printer name search function 1421. The search function may include a function that lists pre-reserved set names and readily narrows down a printer by making a user select it. In the search function, a plurality of set names may also be selected simultaneously or stepwisely so that a printer can be narrowed down by a plurality of key words.

In the aforementioned embodiment, although a description has been given of automatic naming when the batch setting is additionally registered upon print execution, the control unit 1006 of the print service 330 may also apply the naming rule at this time to the batch setting. Also, print setting feature information including not only a printer name but also capabilities, print settings, and other metadata may be linked to a printer and the resulting information is stored in the printer information storage unit 1002 as the search object. As described above, a user is relieved from the inconvenient name input with the aid of the automatic naming function and can understand the content of print settings when he/she sees its name. In addition, a printer can be narrowed down by searching.

Sixth Embodiment

In the aforementioned embodiment, the batch function is determined from the printer name in the third registration method. However, if a part of the printer name is cut off from the display because the name is too long or if the number of printers becomes too many, it may be difficult for user to visually select a printer. Thus, in the sixth embodiment, the printer information presentation unit 1003 displays the print setting reflected on the printer mark. In this manner, a user can visually select a printer.

In the present embodiment, the operation unit 702 reflects the feature extracted from the print settings on a printer mark 1433 shown in FIG. 16C2. For example, one-sided/double-sided printing, N page settings, color/monochrome settings, stapling/no stapling, or the like are changed into icons. When the composite settings are created in step S1901 shown in FIG. 22, the operation unit 702 creates an icon on which the settings have been reflected or selects an icon from the icon list. In step S1933, the main processing management service 321 transmits icon location information (URL or the like) to the print service 330 via the print service proxy 325 when a printer is registered on the print service 330. The icon location information may be directly used for data communication or may be included in the capabilities or the print settings. An icon is placed on a public location in advance or is registered, for example, on the printer information storage unit 1002 of the print service 330.

Note that the feature extracted from the available functions may also be reflected on a printer icon. For example, information such as duplex printable, color printable, staplable, or the like can be expressed by a printer icon. Depending on purpose, there can be assumed two cases where the feature of the function or the capabilities is reflected or where the feature of the print settings is reflected for separate use. For example, an original printer performs function display and a batch setting printer performs print setting display. As described above, the feature of the linked settings is reflected on an icon affixed to a printer, and thus, a user can select a printer in an intuitive manner. Note that the control unit 1006 of the print service 330 may reflect the print settings on an icon and cause the Web browser 340 to display the icon via the printer information presentation unit 1003.

Seventh Embodiment

In the aforementioned embodiment, the composite settings which are desired to be used for the batch setting are initially created. However, it is time-consuming for a user to create the composite settings each time. Accordingly, a description will be given of a method for reducing a time and labor for creating the composite settings each time.

In the present embodiment, the composite settings of which the frequency in use is typically high are set to be available as a preset in advance. For example, the settings in which duplex setting is turned ON, the settings in which monochrome printing is turned ON, the settings in which stamping is turned ON, or the like is contemplated based on the print setting specified values. Hence, when a printer is registered on the print service 330 and the printer information storage unit 1002 stores the printer in the management table shown in FIG. 12B, the operation unit 702 of the main processing management service 321 adds these settings as presets. These are stored in the user information storage unit 703 as shown in the ProfileName 1214 and the ProfilePT 1215 in FIG. 13B1. The operation unit 702 of the main processing management service 321 lists these presets on composite settings 1412 on the screen shown in FIG. 16B which is displayed upon registration of composite settings. A user can use these composite settings only by turning the check box of the necessary composite settings ON and registering the settings.

The created composite settings may also be available for other models or other users. In this case, the created ProfileName 1214 and ProfilePT 1215 in the management table shown in FIG. 13B1 are copied for other models or other users. As described above, a time and labor for creating the composite settings each time can be reduced by preparing the presets of composite settings in advance. Also, the composite settings created by a user for a certain model are copied for other models or other users, whereby the created composite settings can be promoted to be reused.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-259715 filed Nov. 29, 2011, which is hereby incorporated by reference herein in its entirety.

What is claimed is:

1. A print system comprising:
    a print service server that provides a print setting screen to a user device, receives print settings set by a user via the provided print setting screen, and generates a print job based on the received print settings; and
    an information processing device that is capable of communicating with the print service server,
    wherein the information processing device comprises:
        a registration unit configured to transmit printer information including the print settings to the print service server and register the printer information in the print service server;
        a reception unit configured to receive a request for realizing a batch setting in the print service server, in which a plurality of print settings is settable in a collective manner; and
        a determination unit configured to determine, when a batch setting registration request has been received from the user device, whether or not prohibition processing is performed by the print service server, on the basis of support information which is acquired from the print service server,
    wherein the print service server comprises generation unit configured to generate a printer selection screen on which a printer corresponding to each of the printer information and batch setting printer information is selectable as a result of the registration of both the printer information,
    wherein, when the determination unit determines that the prohibition processing is not performed by the print service server, the registration unit registers the batch setting printer information regarding the printer as that corresponding to the printer information and corresponds to setting content of the batch setting desired for implementation, in addition to the printer information in the print service server, and
    wherein, when the determination unit determines that the prohibition processing is performed by the print service server, the registration unit determines whether or not the batch setting associated with a batch setting name is registered by the print service server.

2. The print system according to claim 1, wherein the registration unit acquires support information from the print service server,
    wherein the determination unit determines on the basis on the support information whether or not a print setting associated with a batch setting selected upon a print instruction by the user is reflected on the print job by the print service server,
    wherein, when the determination unit determines that the print setting associated with the batch setting selected upon a print instruction by the user is reflected on the print job by the print service, the registration unit registers the batch setting name and the batch setting in the print service server,
    wherein, when the determination unit determines on the basis of the support information that the print setting associated with the batch setting selected upon the print instruction by the user is not reflected on the print job but the batch setting name is displayed on the user device by the print service server, the registration unit registers the batch setting as a display object in the print service server, and
    wherein, when the determination unit determines on the basis of the support information that the print setting associated with the batch setting selected upon a print instruction by the user is not reflected on the print job and the batch setting name is not displayed on the user device by the print service server, the registration unit registers the batch setting printer information regarding the printer as that corresponding to the printer information and corresponds to the setting content of the batch setting selected by the user, in addition to the printer information in the print service server.

3. The print system according to claim 1, wherein, when the generation unit has received the determination result indicating that the print setting associated with the batch setting selected upon a print instruction by the user is reflected on the print job the determination result indicating that the print setting associated with the batch setting selected upon the print instruction by the user is not reflected on the print job but the batch setting name is displayed on the user device by the print service server, the generation unit generates a printer selection screen on which the batch setting name is displayed, and
    wherein, when the generation unit has received the determination result indicating that the print setting associated with the batch setting selected upon the print instruction by the user is not reflected on the print job and the batch setting name is not displayed on the user device by the print service server, the generation unit generates a printer selection screen on which a printer corresponding to each of the printer information and the batch setting printer information is selectable as a result of the registration of both the printer information.

4. The print system according to claim 1, wherein the printer information includes at least one printer function information relating to print items, and
wherein, when the reception unit further has received a request including a function restriction instruction from the user device, the registration unit restricts a printer function corresponding to the printer function information included in the printer information depending on the restriction instruction.

5. The print system according to claim 1, wherein the information processing device further comprises a storage unit configured to store printer information including the print settings as first printer information and store batch setting printer information regarding the printer as that corresponding to the first printer information and corresponds to the setting content of the batch setting, as second printer information.

6. The print system according to claim 1, wherein the information processing device further comprises a changing unit configured to automatically name the batch setting or selectably changes the batch setting name to a short name and causes the user device to display the changed name.

7. The print system according to claim 1, wherein the information processing device further comprises a changing unit configured to selectably change the batch setting name to an icon and causes the user device to display the icon.

8. A relay server that is capable of communicating with a print service server that provides a print setting screen to a user device, receives print settings set by a user via the provided print setting screen, and generates a print job based on the received print settings, the relay server comprising:
a registration unit configured to transmit printer information including the print settings to the print service server and register the printer information in the print service server;
a reception unit configured to receive a request for realizing a batch setting in the print service server in which a plurality of print settings is settable in a collective manner; and
a determination unit configured to determine, when a batch setting registration request has been received from the user device, whether or not prohibition processing is performed by the print service server, on the basis of a support information which is acquired from the print service server,
wherein, when the determination unit determines that the prohibition processing is not performed by the print service server, the registration unit registers batch setting printer information regarding the printer as that corresponding to the printer information and corresponds to setting content of the batch setting desired for implementation, in addition to the printer information in the print service server, and causes the print service server to generate a printer selection screen on which a printer corresponding to each of the printer information and batch setting printer information is selectable, and
wherein, when the determination unit determines that the prohibition processing is performed by the print service server, the registration unit determines whether or not the batch setting associated with a batch setting name is registered by the print service server.

9. A method for controlling a print system that comprises a print service server that provides a print setting screen to a user device, receives print settings set by a user via the provided print setting screen, and generates a print job based on the received print settings; and an information processing device that is capable of communicating with the print service server, the method comprising:
transmitting, by the information processing device, printer information including the print settings to the print service server and registering the printer information in the print service server;
receiving, by the information processing device, a request for realizing a batch setting in the print service server in which a plurality of print settings is settable in a collective manner;
determining, by the information processing device, when a batch setting registration request has been received from the user device, whether or not prohibition processing is performed by the print service server, on the basis of a support information which is acquired in the registering from the print service server; and
generating, by the print service server, a printer selection screen on which a printer corresponding to each of the printer information and the batch setting printer information is selectable as a result of the registration of both the printer information,
wherein, when the information processing device determines that the prohibition processing is not performed by the print service server in the determining, the information processing device registers, in the registering, the batch setting printer information regarding the printer as that corresponding to the printer information and corresponds to the setting content of the batch setting desired for implementation, in addition to the printer information in the print service server, and
wherein, when the information processing device determines that the prohibition processing is performed by the print service server in the determining, the information processing device determines, in the registering, whether or not the batch setting associated with the batch setting name is registered by the print service server.

10. A non-transitory storage medium on which is stored a computer program for making a computer execute a method for controlling a printing system that comprises a print service server that provides a print setting screen to a user device, receives print settings set by a user via the provided print setting screen, and generates a print job based on the received print settings; and an information processing device that is capable of communicating with the print service server, the method comprising:
transmitting, by the information processing device, printer information including the print settings to the print service server and registering the printer information in the print service server;
receiving, by the information processing device, a request for realizing a batch setting in the print service server, by which a plurality of print settings is settable in a collective manner;
determining, by the information processing device, when a batch setting registration request has been received from the user device, whether or not prohibition processing is performed by the print service server, on the basis of a support information which is acquired in the registering from the print service server; and
generating, by the print service server, a printer selection screen on which a printer corresponding to each of the printer information and the batch setting printer information is selectable as a result of the registration of both the printer information, wherein, when the information processing device determines that the prohibition processing is not performed by the print service server in the determining, the information processing device registers, in the registering, the batch setting printer information regarding the printer as that corresponding to the printer information and corresponds to the setting content of the batch setting desired for implementation, in addition to the printer information in the print service server, and wherein, when the information processing device determines that the prohibition processing is performed by the print service server in the determining, the information processing device determines, in the registering, whether or not the batch setting associated with the batch setting name is registered by the print service server.

11. A processing device that is capable of communicating with a print service server that provides a print setting screen to a user device, receives print settings set by a user via the provided print setting screen, and generates a print job based on the received print settings, the processing device comprising:

a registration unit configured to transmit printer information including the print settings to the print service server and register the printer information in the print service server;

a reception unit configured to receive a request for realizing a batch setting in the print service server in which a plurality of print settings is settable in a collective manner; and a determination unit configured to determine, when a batch setting registration request has been received from the user device, whether or not prohibition processing is performed by the print service server, on the basis of a support information which is acquired from the print service server, wherein, when the determination unit determines that the prohibition processing is not performed by the print service server, the registration unit registers batch setting printer information regarding the printer as that corresponding to the printer information and corresponds to setting content of the batch setting desired for implementation, in addition to the printer information in the print service server, and causes the print service server to display a printer selection screen on which a printer corresponding to each of the printer information and batch setting printer information is selectable, and wherein, when the determination unit determines that the prohibition processing is performed by the print service server, the registration unit determines whether or not the batch setting associated with a batch setting name is registered by the print service server.

* * * * *